United States Patent
Sakaida et al.

(10) Patent No.: US 9,007,633 B2
(45) Date of Patent: Apr. 14, 2015

(54) SYSTEMS AND METHODS FOR EFFICIENTLY CAPTURING HIGH-QUALITY SCANS OF MULTI-PAGE DOCUMENTS WITH HAND-HELD DEVICES

(71) Applicant: Fuji Xerox Co., Ltd., Tokyo (JP)

(72) Inventors: Hiroshi Sakaida, Los Altos, CA (US); Scott Carter, Los Altos, CA (US); John Adcock, San Francisco, CA (US); David M. Hilbert, Palo Alto, CA (US); Francine Chen, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 120 days.

(21) Appl. No.: 13/843,409

(22) Filed: Mar. 15, 2013

(65) Prior Publication Data

US 2014/0268247 A1    Sep. 18, 2014

(51) Int. Cl.

| G06F 3/12 | (2006.01) |
|---|---|
| G06K 15/00 | (2006.01) |
| H04H 20/71 | (2008.01) |
| H04H 40/00 | (2008.01) |
| H04N 1/387 | (2006.01) |
| H04N 1/00 | (2006.01) |
| H04N 1/195 | (2006.01) |
| H04N 101/00 | (2006.01) |

(52) U.S. Cl.
CPC .......... *H04N 1/387* (2013.01); *H04N 1/00005* (2013.01); *H04N 1/00031* (2013.01); *H04N 1/00068* (2013.01); *H04N 1/00076* (2013.01); *H04N 1/00307* (2013.01); *H04N 1/00403* (2013.01); *H04N 1/0044* (2013.01); *H04N 1/0045* (2013.01); *H04N 1/00798* (2013.01); *H04N 1/19594* (2013.01); *H04N 2101/00* (2013.01); *H04N 2201/0084* (2013.01); *H04N 2201/0452* (2013.01)

(58) Field of Classification Search
None
See application file for complete search history.

(56) References Cited

U.S. PATENT DOCUMENTS

| 7,849,393 | B1 * | 12/2010 | Hendricks et al. | 715/203 |
|---|---|---|---|---|
| 8,607,166 | B2 * | 12/2013 | Jalon et al. | 715/838 |
| 2002/0031262 | A1 * | 3/2002 | Imagawa et al. | 382/190 |
| 2006/0170958 | A1 * | 8/2006 | Jung et al. | 358/1.15 |
| 2006/0171695 | A1 * | 8/2006 | Jung et al. | 396/56 |

(Continued)

OTHER PUBLICATIONS

Auto Shutter, REC Mode/Recording Techniques, Casio, webpage print date Sep. 19, 2013, 1 pg.

(Continued)

*Primary Examiner* — Madelein A Nguyen
(74) *Attorney, Agent, or Firm* — Morgan, Lewis & Bockius LLP

(57) ABSTRACT

Capturing a sequence of images of a multi-page printed document is performed by a handheld device, such as a Smartphone. The device has one or more processors, memory, and a digital image sensor. The device monitors preview images of a first printed page of the multi-page printed document, where the preview images are generated by the digital image sensor. Without user indication of when to capture an image, the device captures a still image of the first printed page when a first quality metric of the preview images exceeds a first quality threshold. The device repeats the monitoring and capturing of additional pages until receiving indication from the user that capturing images is complete. In response to receiving indication from the user that capturing images is complete, the device concatenates the captured still images into a single digital document and stores the single digital document.

17 Claims, 21 Drawing Sheets

(56) References Cited

U.S. PATENT DOCUMENTS

| | | | |
|---|---|---|---|
| 2007/0236505 A1* | 10/2007 | Jung et al. | 345/589 |
| 2007/0281666 A1* | 12/2007 | Yoshida | 455/411 |
| 2008/0037880 A1* | 2/2008 | Lai | 382/232 |
| 2008/0082903 A1* | 4/2008 | McCurdy et al. | 715/200 |
| 2008/0176599 A1* | 7/2008 | Kim | 455/556.1 |
| 2008/0294674 A1* | 11/2008 | Reztlaff et al. | 707/102 |
| 2009/0007019 A1* | 1/2009 | Kobayashi et al. | 715/838 |
| 2009/0244620 A1* | 10/2009 | Takahashi et al. | 358/1.15 |
| 2010/0202026 A1 | 8/2010 | Chiu et al. | |
| 2011/0019224 A1* | 1/2011 | Austin | 358/1.15 |
| 2011/0115885 A1* | 5/2011 | Wernersson | 348/47 |
| 2013/0215116 A1* | 8/2013 | Siddique et al. | 345/420 |
| 2013/0232409 A1* | 9/2013 | Cranfill et al. | 715/256 |
| 2013/0238518 A1* | 9/2013 | Miller et al. | 705/325 |
| 2014/0092438 A1* | 4/2014 | Schultz | 358/1.18 |
| 2014/0096021 A1* | 4/2014 | Gowen et al. | 715/738 |
| 2014/0096041 A1* | 4/2014 | Gowen et al. | 715/753 |
| 2014/0195921 A1* | 7/2014 | Grosz et al. | 715/738 |
| 2014/0233864 A1* | 8/2014 | Chan et al. | 382/312 |
| 2014/0236978 A1* | 8/2014 | King et al. | 707/758 |

OTHER PUBLICATIONS

Van Dyk, Camcard Application Review, Creative Overflow, Internet Archive Wayback Machine, Dec. 22, 2011, 6 pgs.
CamScanner, iTunes Preview, Internet Archive Wayback Machine, Mar. 20, 2012, 3 pgs.
Casio EX-S10 Review: Overview, Jun. 27, 2008, 38 pgs.
Casio EX-Z60 Review: Overview, Jun. 12, 2006, 39 pgs.
Kumar, Sharpness Estimation for Document and Scene Images, Nov. 11, 2012, 4 pgs.
ClearCam, iTunes Preview, Internet Archive Wayback Machine, May 18, 2012, 3 pgs.
Doermann, The Detection of Duplicates in Document Image Databases, Image and Vision Computing, Nov. 12, 1997, 14 pgs.
Exilim, Tips & Tricks, Auto Shutter Function, Internet Archive Wayback Machine, Mar. 5, 2012, 2 pgs.
Ferzli, A No-Reference Objective Image Sharpness Metric Based on the Notion of Just Noticeable Blur (JNB), IEEE Transactions on Image Processing, vol. 18, No. 4, Apr. 2009, 12 pgs.
Genius Scan—PDF Scanner, iTunes Preview, Internet Archive Wayback Machine, May 14, 2012, 3 pgs.
Jayant, Supporting Blind Photography, 2011, 8 pgs.
JotNot Scanner Pro, MobiTech 3000 LLC, webpage date Sep. 20, 2013, 3 pgs.
Liu, High Accuracy and Language Independent Document Retrieval with a Fast Invariant Transform, 2009, 4 pgs.
TurboScan: Quickly Scan Multipage Documents into High-Quality PDFs, Sep. 19, 2013, 2 pgs.
Vazquez, Facilitating Photographic Documentation of Accessibility in Street Scenes,CHI 2011 Work-in-Progress, May 7-12, 2011, 6 pgs.
OpenCV, Internet Archive Wayback Machine, Jul. 20, 2012, 2 pgs.
White, EasySnap: Real-time Audio Feedback for Blind Photography, University of Rochester Computer Science, Oct. 3-6, 2010, 2 pgs.
Freeman, How to Use the Whiteboard Feature on Casio Exilim 10.1 Megapixel Camera, Internet Archive Wayback Machine, Sep. 27, 2009, 3 pgs.

* cited by examiner

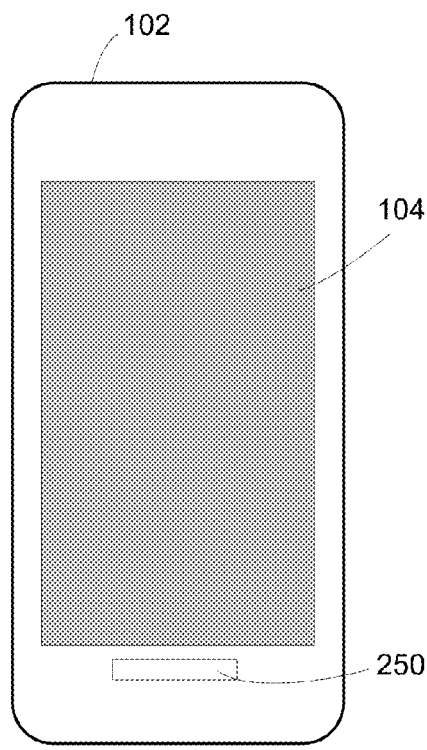
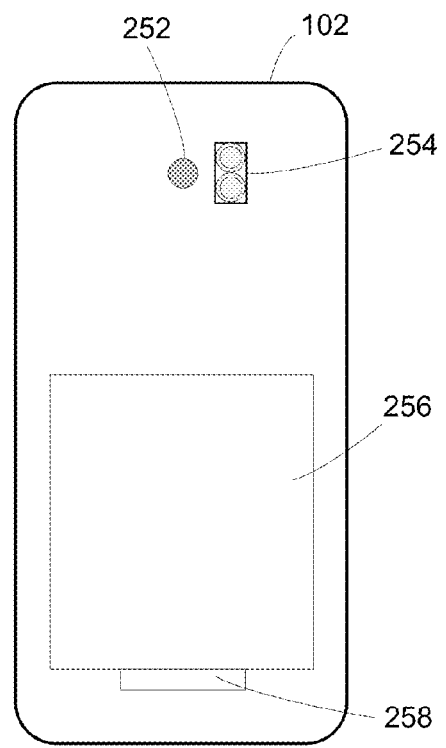
Figure 2B (front)   Figure 2C (back)

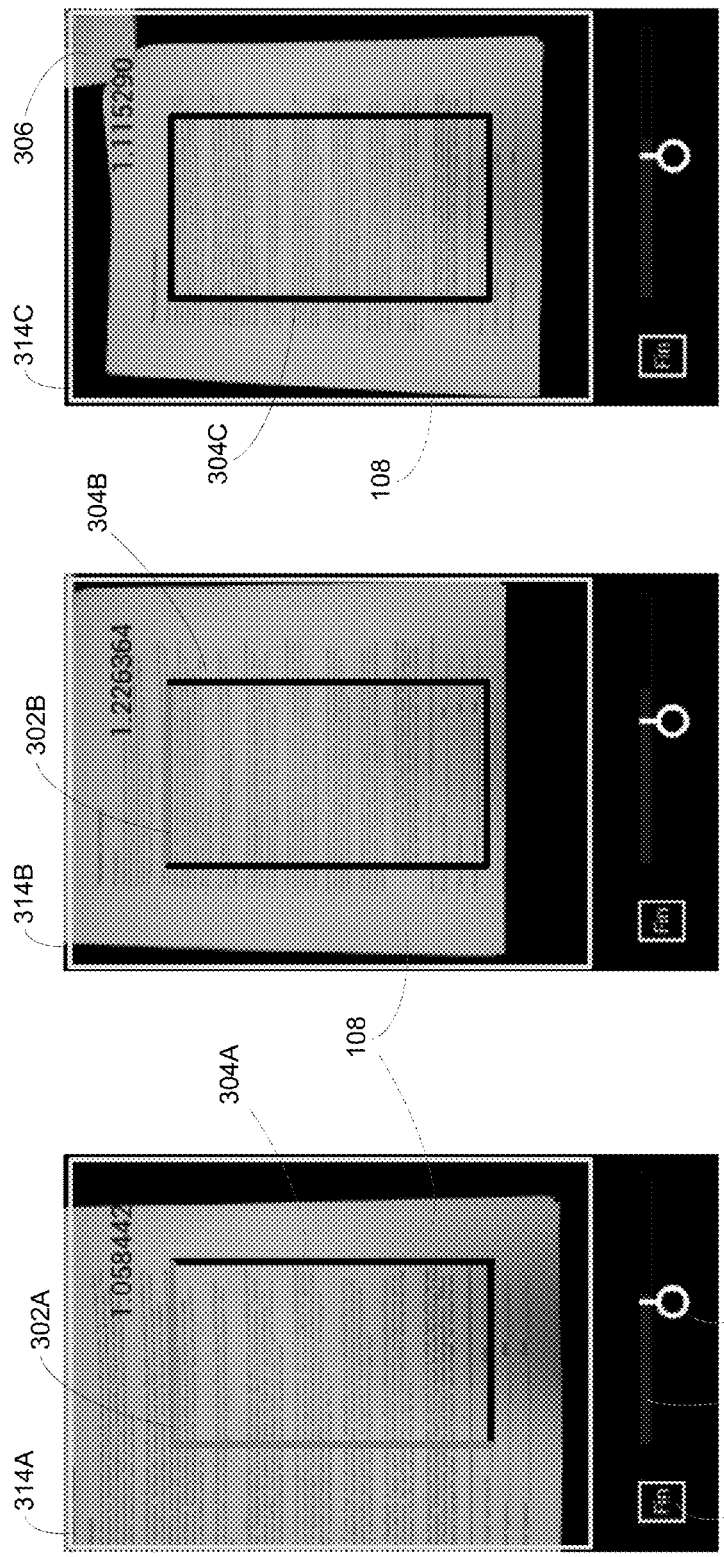

SYSTEMS AND METHODS FOR EFFICIENTLY CAPTURING HIGH-QUALITY SCANS OF MULTI-PAGE DOCUMENTS WITH HAND-HELD DEVICES

CROSS REFERENCE TO RELATED APPLICATION

This application is related to U.S. patent application Ser. No. 13/586,784, filed Aug. 15, 2012, entitled "Smart Document Capture based on Estimated Scanned-Image Quality," which is hereby incorporated by references in its entirety.

TECHNICAL FIELD

The disclosed implementations relate generally to the capture of digital images, and more specifically to capturing a sequence of digital images using a handheld device.

BACKGROUND

There are applications that enable people to use their mobile phones as hand-held document scanners. The typical process requires a user to simultaneously hold a document in place, position the mobile phone/device, review the preview images, and press a button when the user believes the image is clear and properly positioned.

Capturing a high-quality scan of a multi-page document with a hand-held device is particularly difficult. Users must pay attention to the camera preview while simultaneously positioning the device (for proper framing) and steadying the device (to maximize sharpness). The user manually snaps and reviews each photo before moving on to the next page. Finally, users must divert cognitive and physical resources to turn pages, while attempting to minimize the impact of page-turning on the camera positioning and steadying that they performed previously. This process is slow, cumbersome, and error prone.

SUMMARY

The present invention reduces the cognitive and physical demands on users scanning multi-page documents with hand-held devices. From a user's perspective, once the device is initially positioned and steadied, the experience is similar to shooting a video of the document while turning pages. Disclosed implementations do what is necessary to ensure a high-quality scan. This allows users to focus their cognitive and physical resources on a simpler task: holding the device steady with one hand while turning pages with the other hand.

In some implementations, during the capture process, the application: (a) analyzes image quality of preview frames to enable auto-shooting; (b) analyzes image quality of captured images to determine when re-shooting is necessary; and (c) signals to the user (e.g., via sound) when the user can turn the page. After capture, some implementations provide streamlined user interfaces that leverage image quality to direct a user's attention to just those images most in need of review, thereby reducing the need to review all images. Some implementations support burst-mode capture (e.g., capturing more than one photo of each page, then automatically select the best one for each page) as well as streamlined 2-sided document capture and review.

As described below, the user does not need to push a button to capture an image. Instead, capture is performed without requiring the user to decide when the image quality is good enough. Disclosed implementations address capturing images of multi-page documents, including: methods for handling when to capture; retaking a shot of poor quality (e.g., blurry or not framed well); and reordering captured images. In addition, some implementations support taking multiple shots of a single page, which can improve the quality of saved images when performing multi-page capture.

To support optimal capture of entire pages, some implementations automatically identify the edges of a page, allowing for documents where the corner is stapled, and preventing the capture of images where portions of a page are obscured by extraneous objects, such as fingers.

According to some implementations, a method of capturing a sequence of images of a multi-page printed document is performed by a handheld device, such as a Smartphone. The device has one or more processors, memory, and a digital image sensor. The device monitors preview images of a first printed page of the multi-page printed document, where the preview images are generated by the digital image sensor. Without user indication of when to capture an image, the device captures a still image of the first printed page when a first quality metric of the preview images exceeds a first quality threshold. In some implementations, the user is notified of the image capture, and thus the user knows to turn to the next page in the printed document. The device repeats the monitoring and capturing of additional pages until receiving indication from the user that capturing images is complete. The indication can be active (e.g., explicitly pressing a "Finished" button or closing the scanning application) or passive (e.g., lack of movement or device inactivity for a certain period of time). In response to receiving indication from the user that capturing images is complete, the device concatenates the captured still images into a single digital document and stores the single digital document.

According to some implementations, capturing an image of a respective printed page further comprises after capturing the still image: evaluating at least a portion of the captured still image at full resolution according to a second quality metric; and when the second quality metric is below a second quality threshold, discarding the captured still image, notifying the user of the discarded image, and repeating the monitoring of preview images of the respective printed page.

According to some implementations, capturing an image of a respective printed page further comprises after capturing the still image: evaluating at least a portion of the captured still image at full resolution according to a second quality metric and comparing the quality metric to a second quality threshold. When the second quality metric is below the second quality threshold, repeating the monitoring of preview images of the respective printed page, and when the second quality metric is at or above the second quality threshold, notifying the user the still image has been captured.

According to some implementations, in response to receiving indication from the user that capturing images is complete, the device performs some additional operations. The device evaluates each of the captured still images, and assigns a respective second quality score to each respective captured still image. The device sorts the captured still images according to their assigned second quality scores. Then the device prompts the user to review the captured still images in the sorted order, and repeats the monitoring and capturing operations for images selected by the user. In this review process, the captured still images selected by the user are replaced with higher quality captured images.

BRIEF DESCRIPTION OF THE DRAWINGS

FIGS. 2B and 2C illustrate a handheld device with a digital image sensor in accordance with come implementations.

FIGS. 3A-3D illustrate positioning a handheld device to take a photo of a printed page in accordance with some implementations.

Like reference numerals refer to corresponding parts throughout the drawings.

DESCRIPTION OF IMPLEMENTATIONS

Figure 1:
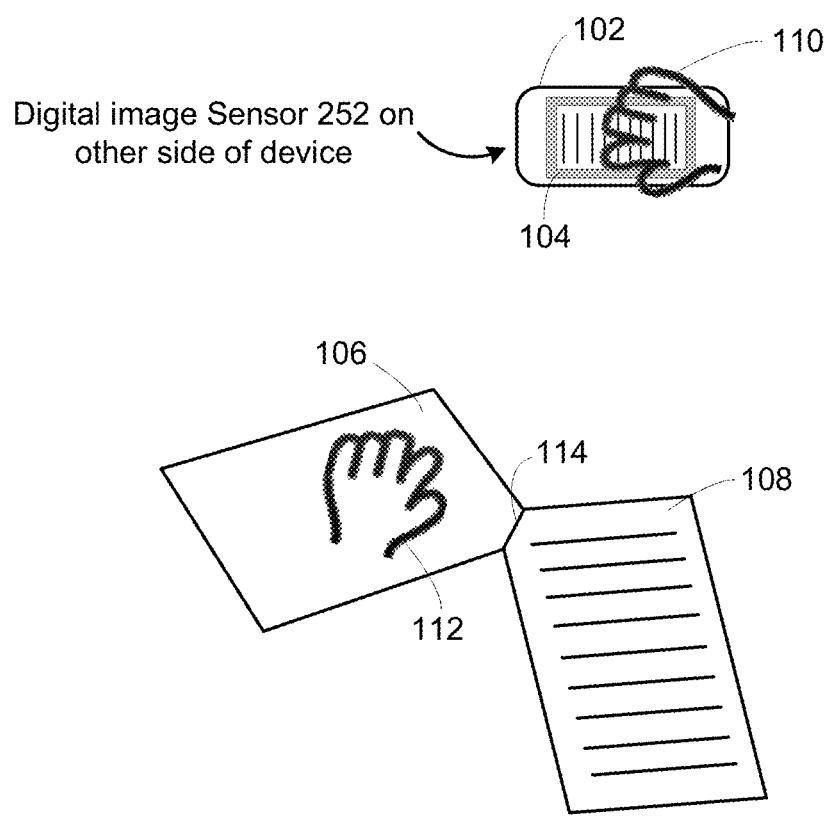
FIG. 1 illustrates the context in which some implementations of the present invention operate.

FIG. 1 illustrates the context in which some implementations of the present invention operate. In FIG. 1, two pages 106 and 108 of a multi-page document are shown, and are connected together at corner 114 (e.g., by a staple). In FIG. 1, the document is single-sided. The front side of the page 108 is visible, and the back side of the page 106 (which is blank) In this illustration a person's left hand 112 is holding down the page 106 to keep the document in place.

Above the document is a handheld device 102, held by a person's right hand 110. The display screen 104 shows a preview image from the digital image sensor 252, which is on the opposite side of the device 102 (see FIGS. 2B and 2C). When the device 102 is positioned properly over the page 108 and the image is sufficiently clear, a scanning application 224 on the device automatically snaps a photo of the page 108 and indicates to the user to flip to the next page. In some implementations the device uses an audible sound to notify the user to go to the next page. As described in more detail in FIGS. 4-8, some implementations allow the user to take multiple photos of each page (later automatically selecting the best one) or compute a quality metric for the captured photo directly, and letting the user know if the quality metric is below a predefined quality threshold (in which case the captured photo is discarded).

Figure 2A:
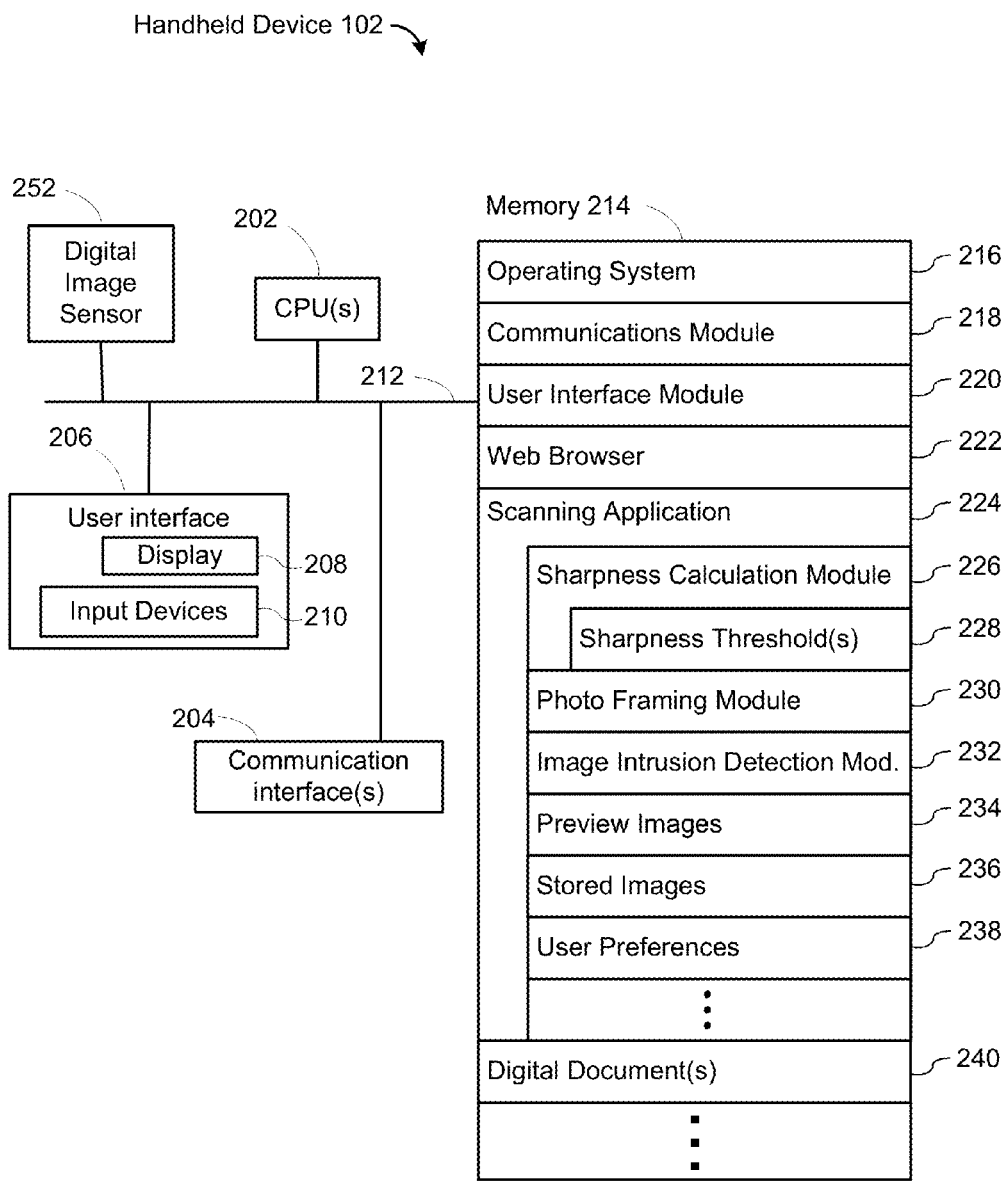
FIG. 2A is a block diagram illustrating a handheld device in accordance with some implementations.

FIG. 2A is a block diagram illustrating a handheld device 102, according to some implementations. The handheld device 102 can be a Smart Phone, or other mobile device that has a digital image sensor 252. The handheld device 102 typically includes one or more processing units (CPU's) 202, one or more network or other communications interfaces 204, memory 214, and one or more communication buses 212 for interconnecting these components. The communication buses 212 may include circuitry (sometimes called a chipset) that interconnects and controls communications between system components. The handheld device 102 also includes a user interface 206 comprising a display device 208 (e.g., a display screen 104) and input devices/mechanisms 210 (e.g., touch screen, physical buttons, microphone for audio commands, etc.). Memory 214 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may optionally include one or more storage devices remotely located from the CPU(s) 202. Memory 214, or alternately the non-volatile memory device(s) within memory 214, comprises a computer readable storage medium. In some implementations, memory 214 stores the following programs, modules and data structures, or a subset thereof:

- an operating system 216 that includes procedures for handling various basic system services and for performing hardware dependent tasks;
- a communication module 218 that is used for connecting the handheld device 102 to other computer systems via the one or more communication interfaces 204 (wired or wireless) and one or more communication networks, such as the Internet, other wide area networks, local area networks, metropolitan area networks, and so on;
- a user interface module 220 that receives commands from the user via the input devices 210 and generates user interface objects in the display device 208;
- a web browser 222 that enables a user to access resources, web pages, and web applications over a communication network;
- a scanning application 224 that enables a user to efficiently create digital images of multi-page printed documents, as described in with respect to FIGS. 3A-15C below. Included in the scanning application 224 are various modules, parameters, and data, including: a sharpness calculation module 226, using techniques such as those described in U.S. patent application Ser. No. 13/586,784; one or more sharpness thresholds 228, which are used to determine when to capture and/or when to discard a captured photo 236; a photo framing module 230, which facilitates properly framing a printed page 108 with respect to the digital image sensor 252 (described in more detail with respect to FIGS. 3A-3C); an image detection module 232, which detects and alerts a user when an object (such as a finger) is protruding over a printed page (described in greater detail with respect to FIGS. 13 and 14); one or more preview images 234 (or a preview image buffer), which are low resolution images provided by the digital image sensor 252 to the sharpness calculation module 226 to determine when to capture a photo; one or more stored (captured) images 236, which are taken at full resolution of the digital image sensor 252; and zero or more user preferences 238, which can specify sharpness threshold(s) 228, how long to wait after capturing a photo before evaluating the preview images 234 for the next page (e.g., half a second), default format for saved documents (e.g., PDF), default directory location for saved documents, layout of elements in the user interface, and so on;
- one or more digital documents 240, built by the scanning application 224 as a concatenation of captured images 236.

Each of the above identified elements may be stored in one or more of the previously mentioned memory devices, and corresponds to a set of instructions for performing a function described above. The set of instructions can be executed by one or more processors (e.g., the CPU's 202). The above identified modules or programs (i.e., sets of instructions) need not be implemented as separate software programs, procedures or modules, and thus various subsets of these modules may be combined or otherwise re-arranged in various implementations. In some implementations, memory 214 may store a subset of the modules and data structures identified above. Furthermore, memory 214 may store additional modules and data structures not described above.

Although FIG. 2A shows a handheld device 102, FIG. 2A is intended more as a functional description of the various features that may be present in a handheld device than as a structural schematic of the implementations described herein. In practice, and as recognized by those of ordinary skill in the art, items shown separately could be combined and some items could be separated.

Each of the methods described herein may be governed by instructions that are stored in a computer readable storage medium and that are executed by one or more processors of handheld device 102. Each of the operations shown in figures (e.g., FIGS. 4-8) may correspond to instructions stored in a computer memory or computer readable storage medium.

FIGS. 2B and 2C illustrate features that may be present in a handheld device 102. FIG. 2B shows the front of a device 102, with a display screen 104 that provides a user interface. Some handheld devices include one or more physical buttons 250 to perform various functions. On the back side of the device 102 (FIG. 2C) is a digital image sensor 252, which can create full resolution digital images as well as lower resolution preview images. Some handheld devices 102 include a flash/light 254, which can be used to illuminate an object for better picture quality. Some handheld devices 102 have a battery compartment 256 with latch 258. One of ordinary skill in the art recognize that handheld devices with digital image sensors come in many different forms, including Smartphones, tablet computers, personal digital assistants (PDA's), digital cameras, personal media players, and so on. Some devices 102 have a digital image sensor 252 on the same side of the device as the display screen 104.

FIGS. 3A-3C illustrate a user interface provided by a scanning application 224 according to some implementations. The user interface appears in the display screen 104 of a handheld device 102. In each of these images, under control of the scanning application 224 the digital image sensor 252 is taking preview images of a document page 108. In some implementations, the scanning application 224 evaluates the preview images for proper framing and/or image quality. In the illustrated implementation, the outer preview image frame (314A, 314B, and 314C) is a single static shape and color. Some implementations omit the outer preview image frame (314A, 314B, and 314C). In other implementations, the color or other characteristics (e.g., thickness) of the preview image frame changes to indicate proper framing of the page 108 and/or quality of the preview images.

In the implementation illustrated in FIG. 3A, the inner preview image frame (also called a framing rectangle) 302A/304A provides feedback about the preview image. Here, the dark portion 304A indicates that the right side and bottom of the page 108 are positioned so that they are not cut off. The lighter portion 302A indicates that the top and left sides of the page 108 are cut off in the preview image. In FIG. 3B, the user has repositioned the handheld device 102 relative to the page 108 (e.g., by moving the device 102), so now the left side of the page is not cut off in the preview image. The scanning application 224 provides feedback, with the dark portion 304B now including the left side as well. Only the top of the page 108 is cut off, as indicated by the light portion 302B. Finally, in FIG. 3C, the user has repositioned the device 102 relative to the page 108 so that none of the edges are cut off. The scanning application 224 indicates this by having the dark portion 304C comprise the entire inner preview image frame. In some implementations, the inner preview image frame changes to a completely different color or shape when the page 108 is properly positioned on all sides.

In some implementations, the same feedback provided by the inner preview image frame is used in the outer preview image frame (314A, 314B, and 314C). In other implementations, an inner preview image frame is not used at all, and the framing feedback is provided just by the outer preview image frame (314A, 314B, and 314C).

Figure 3D:
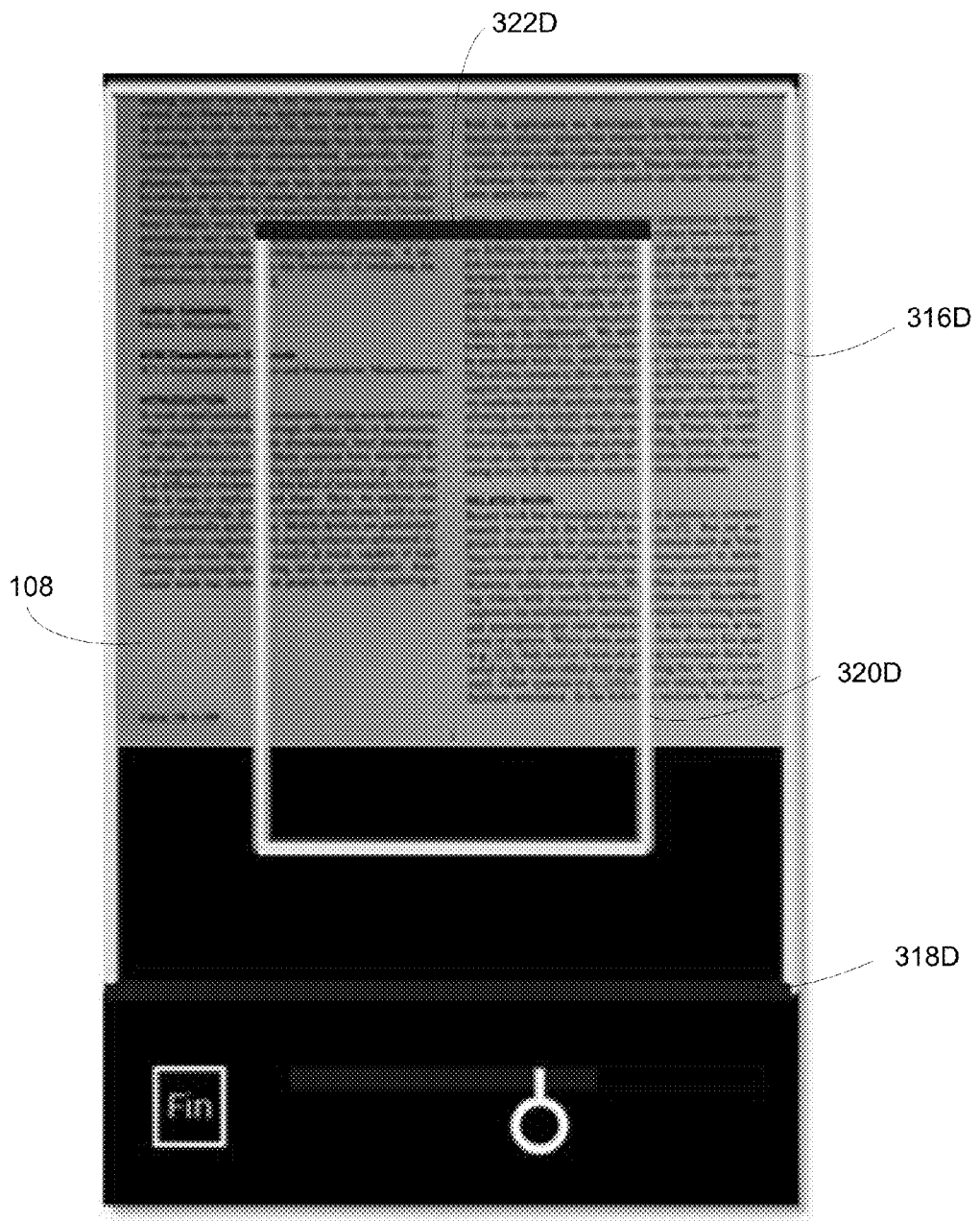

Some implementations use the inner and outer framing rectangles to provide different feedback, as illustrated in FIG. 3D. In the implementations illustrated in FIG. 3D, the outer framing rectangle 316D/318D provides feedback regarding which edges of page 108 are cut off in the preview image (as previously illustrated with respect to the inner preview image frames 302A/304A, 302B/304B, and 304C in FIGS. 3A-3C). Here, the bottom of page 108 is not cut off in the preview image, so the corresponding portion 318 of the outer framing rectangle is displayed in a darker shade. Some implementations utilize color, and display the bottom portion as blue or other dark color. In FIG. 3D, the top and both sides of the page 108 are cut off in the preview image, so the top and side portions 316D of the outer framing rectangle are displayed in a lighter shade. Using color, some implementations display the top and side portions with yellow or other color that is easily distinguished from the dark shade of the bottom portion 318D.

In the implementation illustrated in FIG. 3D, the segments of the inner framing rectangle 320D/322D are colored or shaded to indicate whether the segments are completed over the page 108 in the preview image. The top segment 322D is completely over the page 108, so it is shaded with a dark pattern or color (e.g., blue). The bottom and side segments 320D are not completely over the page 108, so they are shaded with a light pattern or color (e.g., yellow). In this illustration, the bottom segment of the inner framing rectangle is not covering any portion of the page 108, and the side portions of the inner framing rectangle are only partially over the page 108, so they are all shaded with a light pattern or color. In other implementations, the color or shading distinguishes the percentage of the segment that covers the page 108. For example, dark blue for the top segment 322D that completely covers the page 108, yellow for the bottom segment that does not cover the page at all, and an intermediate color or shade for the side segments that partially cover the page 108.

Some implementations provide user configurable options 238 regarding how the framing feedback is provided. For example, some implementations have user preferences to determine which framing rectangles to display, what colors or shading patterns are used, and what the colors or patterns indicate for each of the framing rectangles.

FIG. 3C illustrates that the image can include a corner 306 (e.g., due to stapling). As explained below with respect to FIGS. 11 and 12, such corners 306 do not prevent the application 224 from properly framing pages 108.

Some implementations include one or more controls or informational icons at the bottom of the display screen 104. FIGS. 3A-3C include a button 308 for a user to indicate that scanning of the document is finished. In some implementations, the button 308 is labeled "Fin" or "Done" or other suitable label to convey completion of the scanning. In some implementations, the scanning application 224 is responsive to voice commands, and thus the user can signal completion by saying "finished" or "done." Some implementations that support voice commands do not include a button 308 in the interface.

In some implementations, the scanning application 224 provides additional information, such as visual display indicators 310 and 312 in the user interface in the display screen 104. In some implementations, the icon 312 indicates a minimum threshold for quality of the preview images, and bar 310 indicates the quality of the current preview images (the higher the quality, the further the bar extends to the right).

Figure 4:
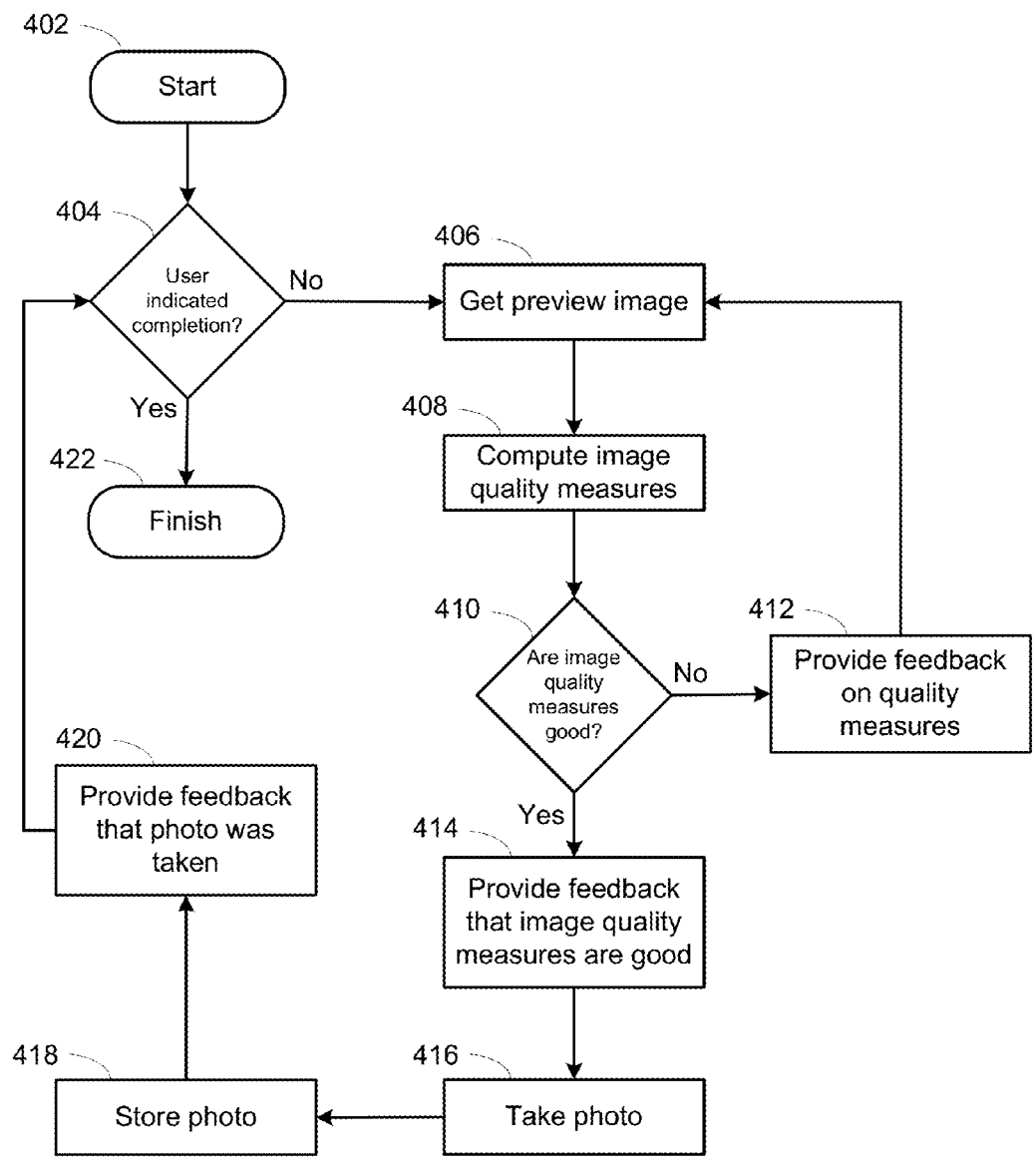
FIGS. 4-8 illustrate process flows for capturing images of a multi-page printed document in accordance with some implementations.

FIG. 4 illustrates the basic operation of capturing a sequence of still images for a multi-page printed document under control of the scanning application 224 in accordance with some implementations. The printed document can be a book, a binder (with the pages bound on top or bottom), a stack of pages (stapled or unstapled), etc. As used herein, "printed document" refers to a hard-copy document with physical pages, as opposed to a digital document that is stored electronically. For example, a sequence of pages of art or hand written pages in a notebook are "printed documents."

Figure 7:
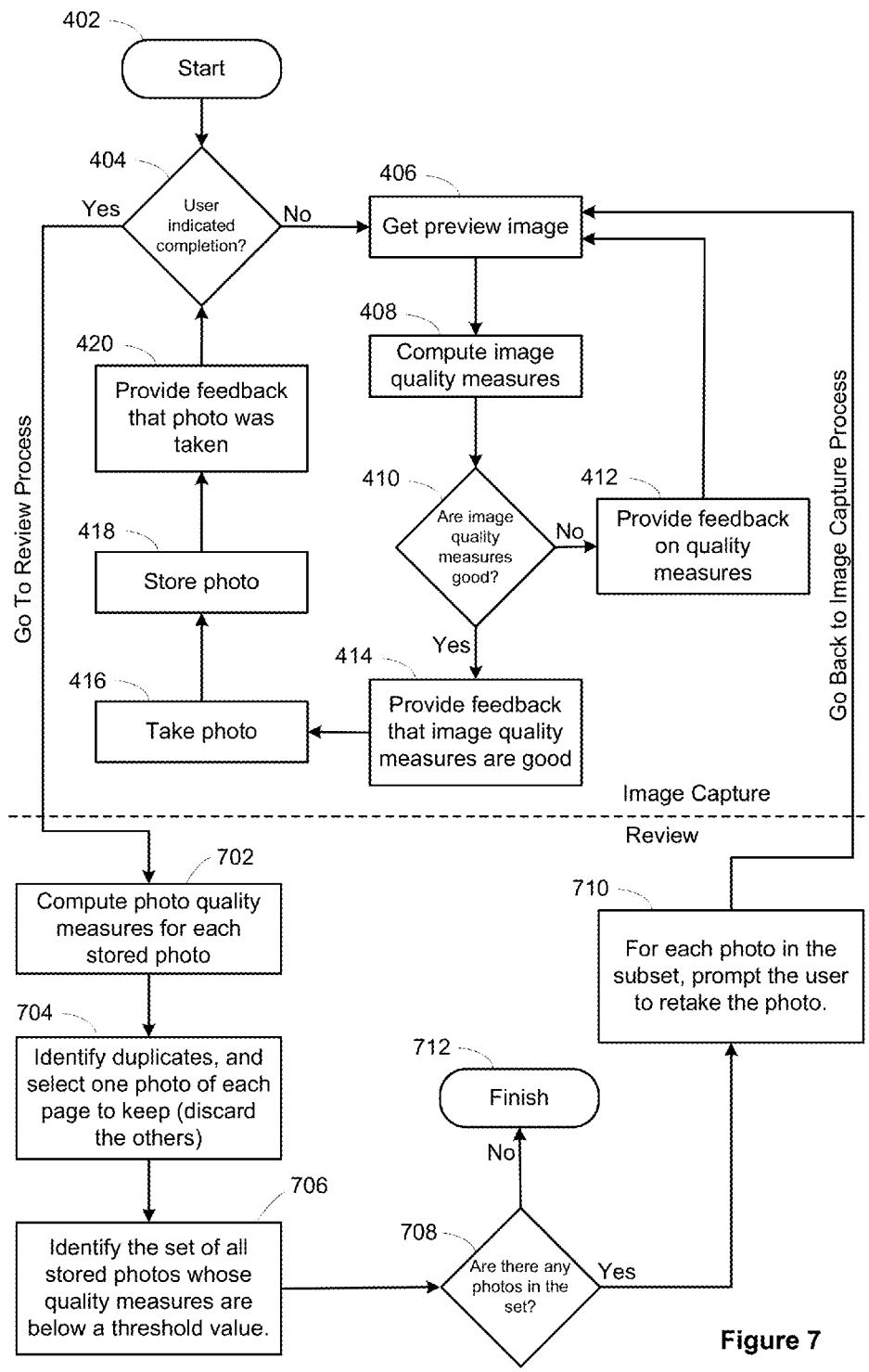
Figure 8:
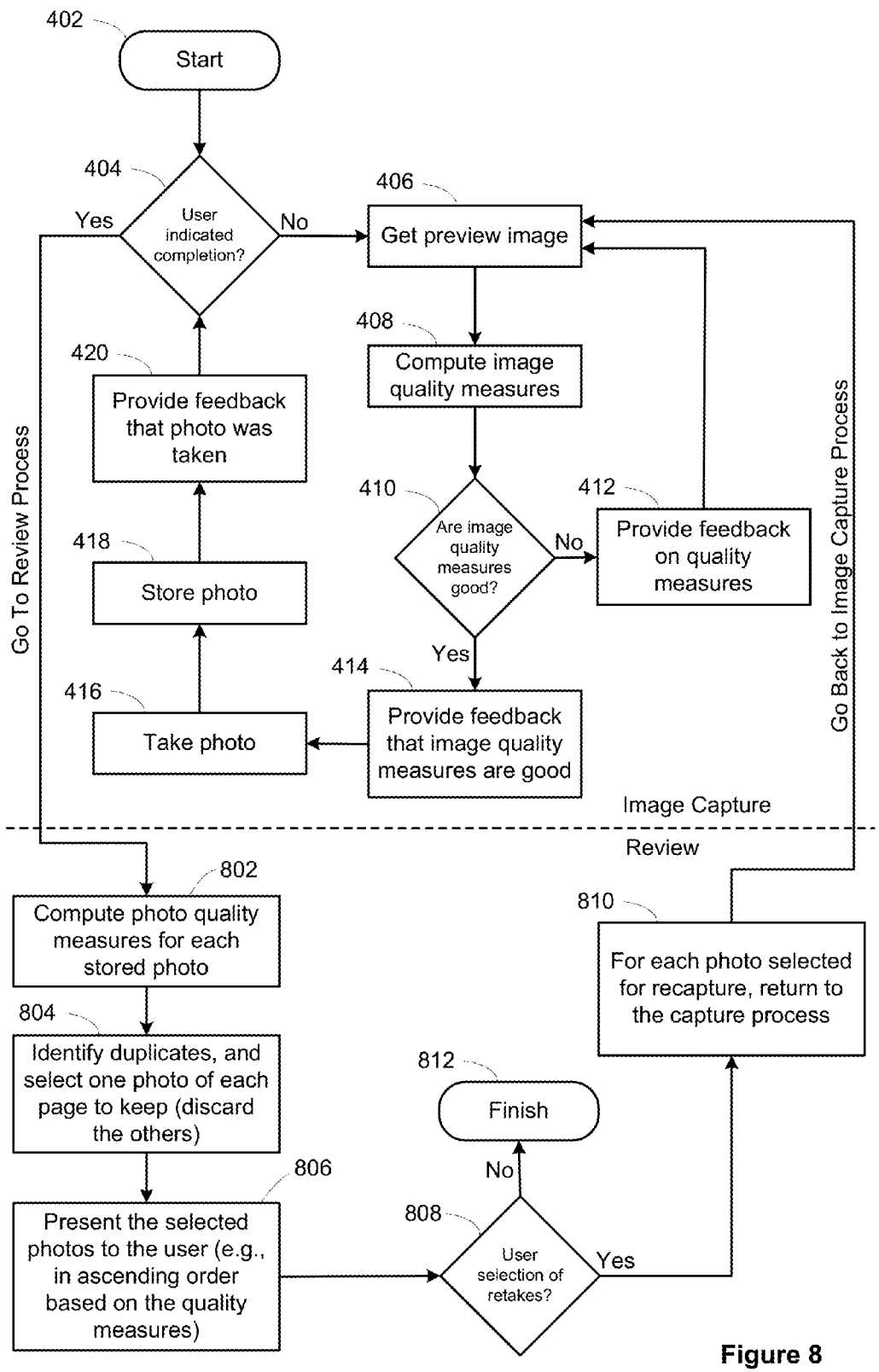

When the user initiates (402) the scanning of a multi-page printed document, the application 224 begins a looping process of scanning pages until the user indicates (404) that the process is complete. One of skill in the art recognizes that the user can initiate (402) scanning in many ways, such as opening the scanning application 224, or pressing a designated button (e.g., "Start Scan") in the user interface of the scanning application 224. When the user indicates (404) completion, the process finishes (422) by saving the captured images in the form of a digital document. One of skill in the art recognizes that a user can indicate (404) completion of a scan in many ways, such as pressing a designated button (e.g., "Fin" or "Finished"), closing the scanning application 224, setting down the device 102 (e.g., detecting lack of movement), or inactivity for a designated timeout period. FIGS. 7 and 8 illustrate post-capture review processes used in some implementations.

The scanning application 224 executing on the device 102 receives (406) preview images 234 taken by the digital image sensor 252. Typically the preview images are taken at a low resolution. Although at a low resolution, the preview images are sufficient to determine whether a page 108 is framed properly, and allows the application 224 to compute one or more image quality measures. For example, how sharp is the image. In some implementations with multiple quality measures, the quality measures are combined in a single quality metric. When the individual quality measures of the preview images or the combined quality measures of the preview images are (410) below a predefined quality threshold, the scanning application provides (412) feedback to the user about the quality, and continues to get (406) preview images. In some implementations the feedback is on the display screen 104 (e.g., bar 310) or an audible indication. This feedback regarding poor quality images may continue for several seconds while the user steadies the device 102 and/or reorients the device 102 to provide better focus.

One method of computing image quality is disclosed in U.S. patent application Ser. No. 13/293,845. Some implementations also utilize accelerometer readings to determine if the device is moving. Although a stationary device is good for sharpness, lack of movement is not sufficient to guarantee a high-quality image. For example, disclosed implementations consider focus, framing, rotation, shadows, lighting, and depth variation.

To compute the sharpness of a preview image 234 or captured image 236, some implementations calculate a difference in grayscale values between pixels at an edge of an image. The differences may involve a slope of grayscale values between two pixels at an edge window and estimating the edge sharpness based on the slope, multiple slopes, or differences in the slopes.

In some implementations, the sharpness calculation module 226 takes an image (either a preview 234 or captured 236), and creates a smoothed copy of the image (smoothed in the x direction, y direction, or both). The smoothing may be performed by any smoothing technique or a filter such as a median filter. The sharpness module 226 then identifies a first window with a first plurality of pixels around an edge pixel of the smoothed image and identifies a second window corresponding to the first window, where the second window is from the original (non-smoothed) image. The second window has a second plurality of pixels around an edge pixel of the original image and the second plurality of pixels correspond to the first plurality of pixels. In some implementations, the smoothed image is generated on the fly for the pixels in the identified window of the original image so that only the pixels of the window are smoothed. The sharpness calculation module estimates edge sharpness based on determining differences in grayscale value between first pairs of pixels from the first window and second pairs of pixels from the second window over at least one of an x-axis direction and a y-axis direction of the first window and the second window.

When the individual quality measures of the preview images or the combined quality measures of the preview images are (410) at or above the quality threshold, the scanning application proceeds with taking a full-resolution photo. This includes providing (414) feedback that the image quality measurements are good and capturing (416) the actual photo of the page 108. The feedback regarding satisfactory quality can include the same visual means used to provide feedback on poor quality images (e.g., bar 310), but may also include other visual or auditory indications as well. In the implementation of FIG. 4, the captured photo is then stored (418). In some implementations, the scanning application provides (420) feedback that the photo was taken, such as an audible "click" sound or a blink of a light (e.g., flash 254). Once the photo is taken and saved, the scanning application 224 is ready to take a photo of the next page in the printed document. The looping process can be terminated here by the user providing (404) indication of completeness (e.g., pressing a "Fin" button 308).

Figure 5:
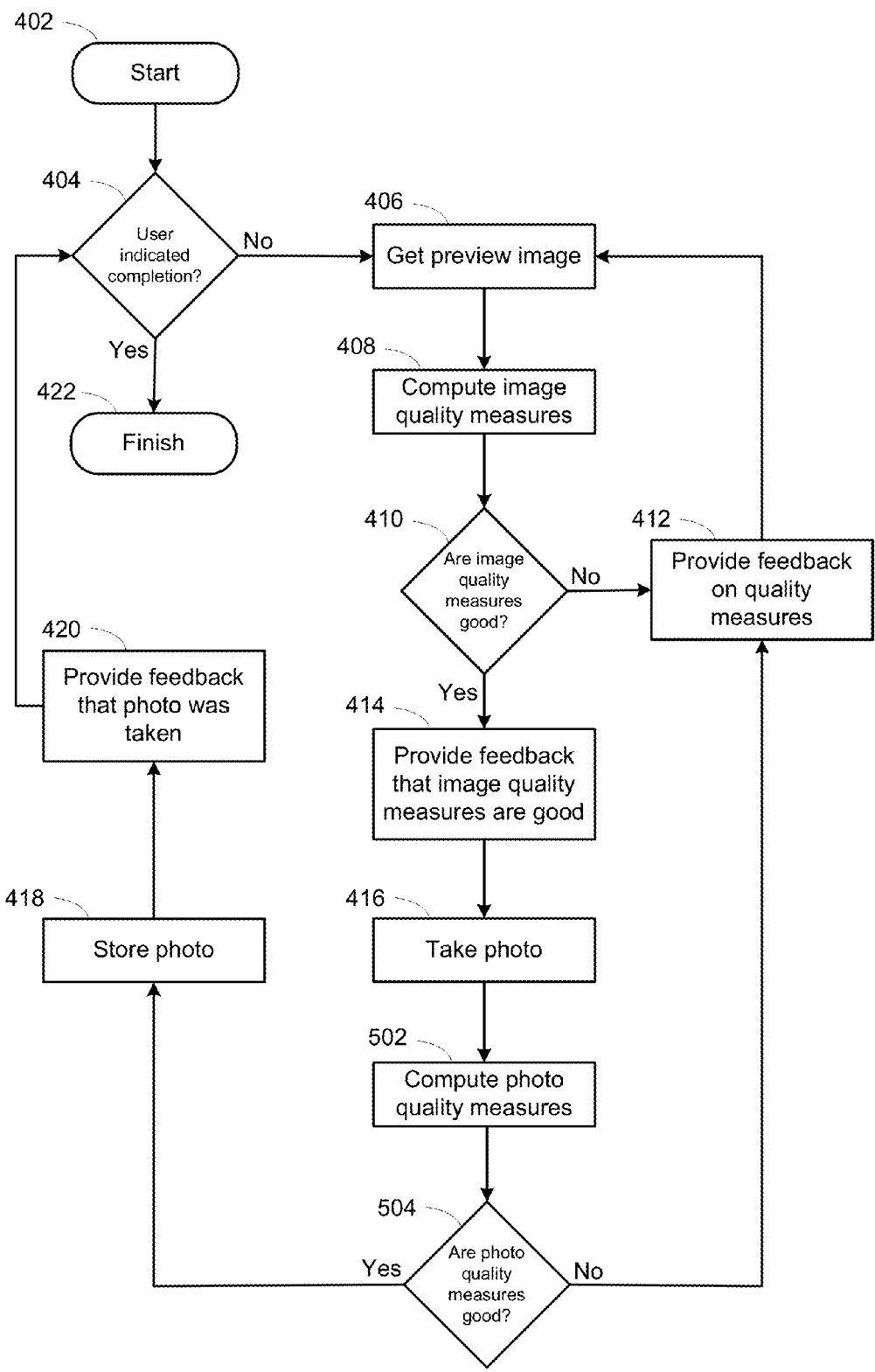

The process flow in FIG. 5 is similar to that of FIG. 4, except that there is a post capture evaluation of each photo. After a photo is captured (416), the scanning application 224 computes (502) one or more quality measures of the captured photo. Typically these are the same quality measures that were computed (408) for the preview images, but the captured image at full resolution provides more detailed information to support the evaluation of quality measures. In addition, even if the preview images were very sharp, the user could accidentally move the device 102 just as the photo is captured, producing a blurry captured image.

The scanning application 224 then compares the quality measures of the photo (or a single combined quality measure) to a photo quality threshold, such as sharpness threshold 228. If the quality measures are (504) not adequate, the scanning application 224 provides (412) feedback about the quality measures and gets (406) new preview images for the same page 108. In some implementations, the scanning application 224 provides auditory feedback (such as a "beep") so that the user knows not to turn to the next page of the printed document. On the other hand, if the quality measures of the photo are (504) adequate, the scanning application 224 proceeds to store (418) the photo (e.g., saved to a non-volatile storage medium).

Even when the quality measures used to evaluate a preview image are the same as the quality measures used to evaluate a captured photo, the threshold may be different. For example, a user may set the quality threshold for photos higher. In some implementations, the quality thresholds are user-configurable.

Figure 6:
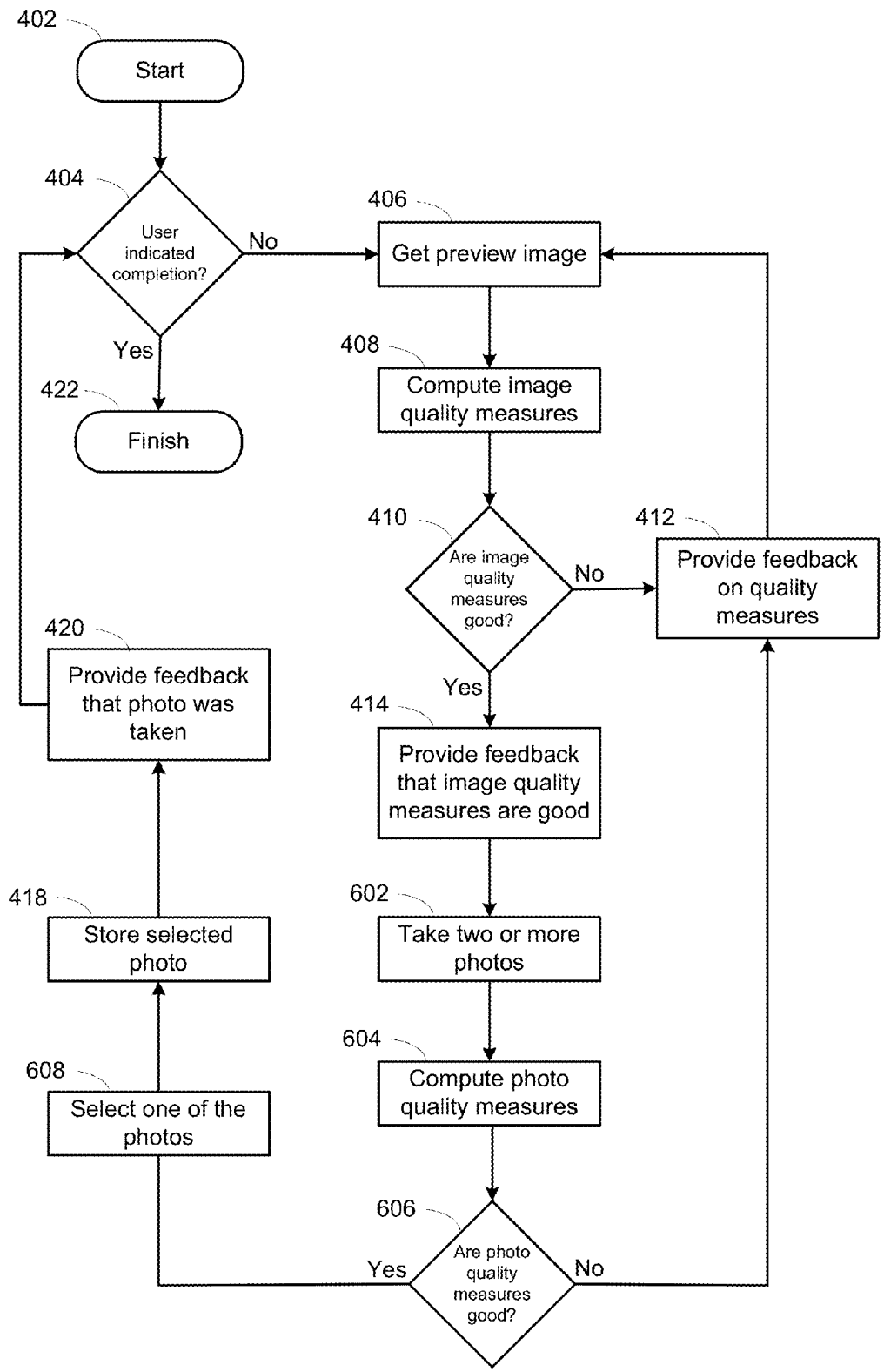

The process flow in FIG. 6 is similar to that of FIG. 5, but captures 2 or more photos for each printed page 108. After providing (414) feedback to the user that the quality of the preview images are good, the scanning application takes (602) two or more photos of the printed page 108, then computes (604) the photo quality measures for each of the captured photos. If the photo quality measures for at least one of the captured photos is (606) exceed (606) the photo quality threshold, the scanning application 224 proceeds to select (608) one of the photos and store (418) the selected photo. Generally, the photo selected is the one with the highest quality measures. If the quality measures for all of the captured photos are below the photo quality threshold, the scanning application 224 provides (412) feedback on the quality measures and then gets (406) new preview images.

FIGS. 7 and 8 illustrate process flows performed under control of the scanning application 224 that include a review process after all of the images for a printed document have been captured. When a batch review process occurs at the end of a scanning process, most implementations omit the review process illustrated in FIGS. 5 and 6 that occurs during the processing of each page. In FIGS. 7 and 8, the upper half of the flow illustrates the image capture process, as described above in FIG. 4. The lower half in FIGS. 7 and 8 illustrate batch review processes, where one or more of the captured and stored images is discarded and replaced with a new image capture of higher quality. When the review process in FIG. 7 or FIG. 8 is complete, the scanning application 224 concatenates the saved captured images 236 in the proper order to create a digital document 240, such as a PDF, and stores the digital document 240.

In FIG. 7, the scanning application 224 identifies the captured images that need to be replaced. After the user signals (404) that image capture is complete, the scanning application proceeds to the review process. The scanning application computes (702) photo quality measures for each of the stored photos. As noted above, there may be a single measure, or multiple measures, or multiple measures combined for form a single quality score for each photo. The application 224 then identifies (704) duplicates, which are two or more saved photos of the same printed page. Duplicates may occur either intentionally or by accident (e.g., leaving the device 102 over a printed page 108 after the first photo was taken). For each set of duplicates, the scanning application 224 selects (704) one stored photo 234 to keep, and discards (704) the others. Generally, implementations select the ones to keep based on the quality measures.

The scanning application 224 then identifies (706) the set of all stored photos whose quality measures are below the photo quality threshold. If this set is (708) empty, the review process is (712) complete. Otherwise, the scanning application alerts the user of the need to retake certain photos, and prompts (710) the user to retake each such photo. The display screen 104 indicates which photos need to be retaken. Retaking a photo uses the same capture process used earlier in the image capture process. In some implementations, the review process repeats after retakes are complete. In some implementations, after the initial batch review process, the individual photos are evaluated one by one, as illustrated in steps 502 and 504 of FIG. 5 or steps 602-608 in FIG. 6.

Similar to the review process in FIG. 7, the review process in FIG. 8 begins with the scanning application computing (802) photo quality measures for each of the stored photos. As noted above, there may be a single measure, or multiple measures, or multiple measures combined for form a single quality score for each photo. The application 224 then identifies (804) duplicates, which are two or more saved photos of the same printed page. Duplicates may occur either intentionally or by accident (e.g., leaving the device 102 over a printed page 108 after the first photo was taken). For each set of duplicates, the scanning application 224 selects (804) one stored photo to keep, and discards (804) the others. Generally, implementations select the ones to keep based on the quality measures.

In the process flow of FIG. 8, the scanning application 224 presents (806) all of the photos (after the duplicates have been discarded). In some implementations, the photos are presented in ascending order based on the quality measures for the photos. (See FIG. 9B.) In this way, the user can deal with the worst images, and at some point decide that the remainder of the stored photos are good. In some implementations, the photos are presented in the order in which they were taken, which could make it easier to retake the needed photos in the same order (rather than jumping around in the printed document). (See FIG. 9A.) If the user selects (808) not to retake any photos, then the review process is (812) complete. On the other hand, when there are (808) some photos that the user decides to retake, the scanning application returns (810) to the capture process for each of the selected photos. The selected photos are discarded and replaced with higher quality retaken photos.

Figure 9A:
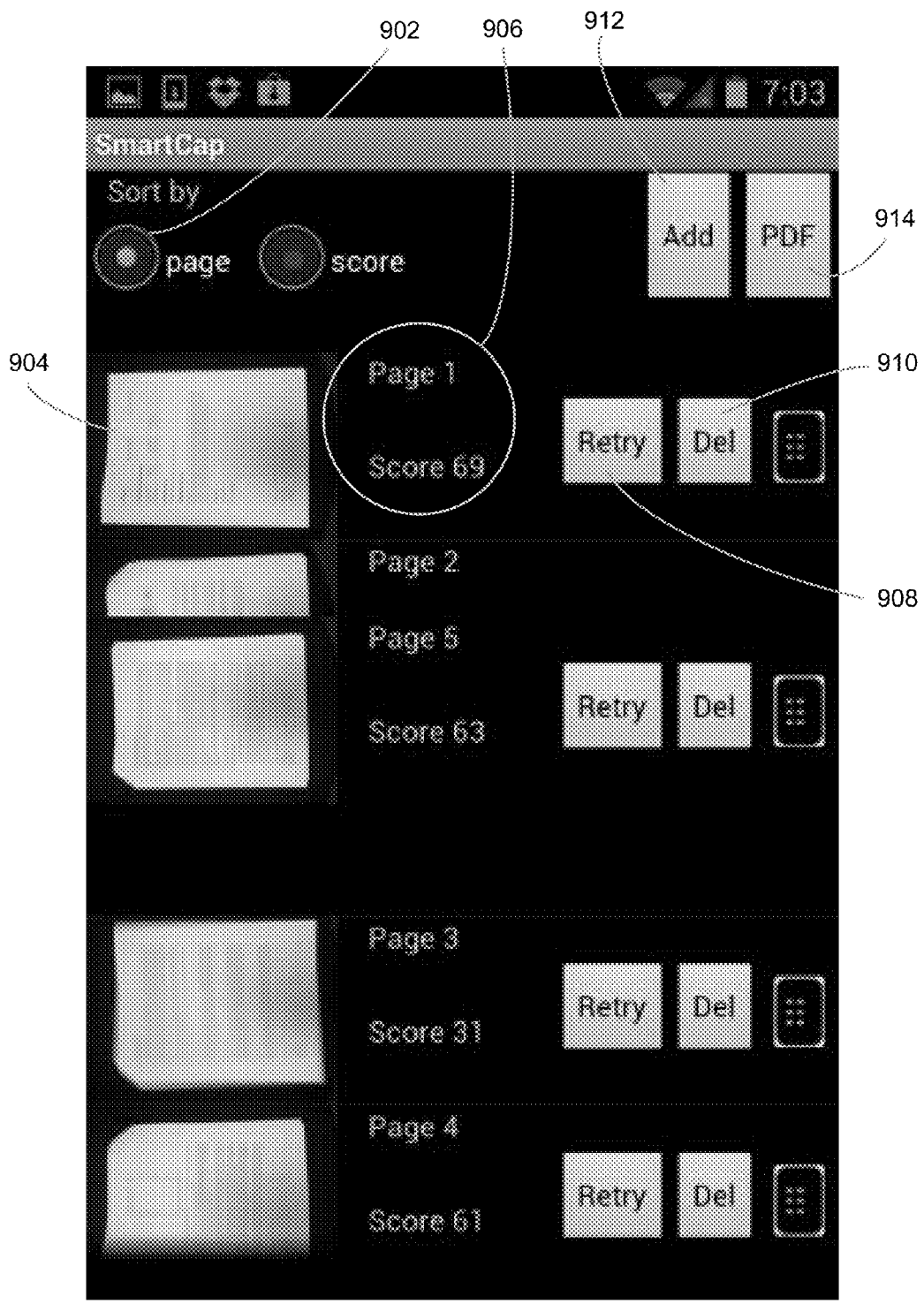
FIGS. 9A-9C illustrate an example user interface for reviewing captured images in accordance with some implementations.
Figure 9B:
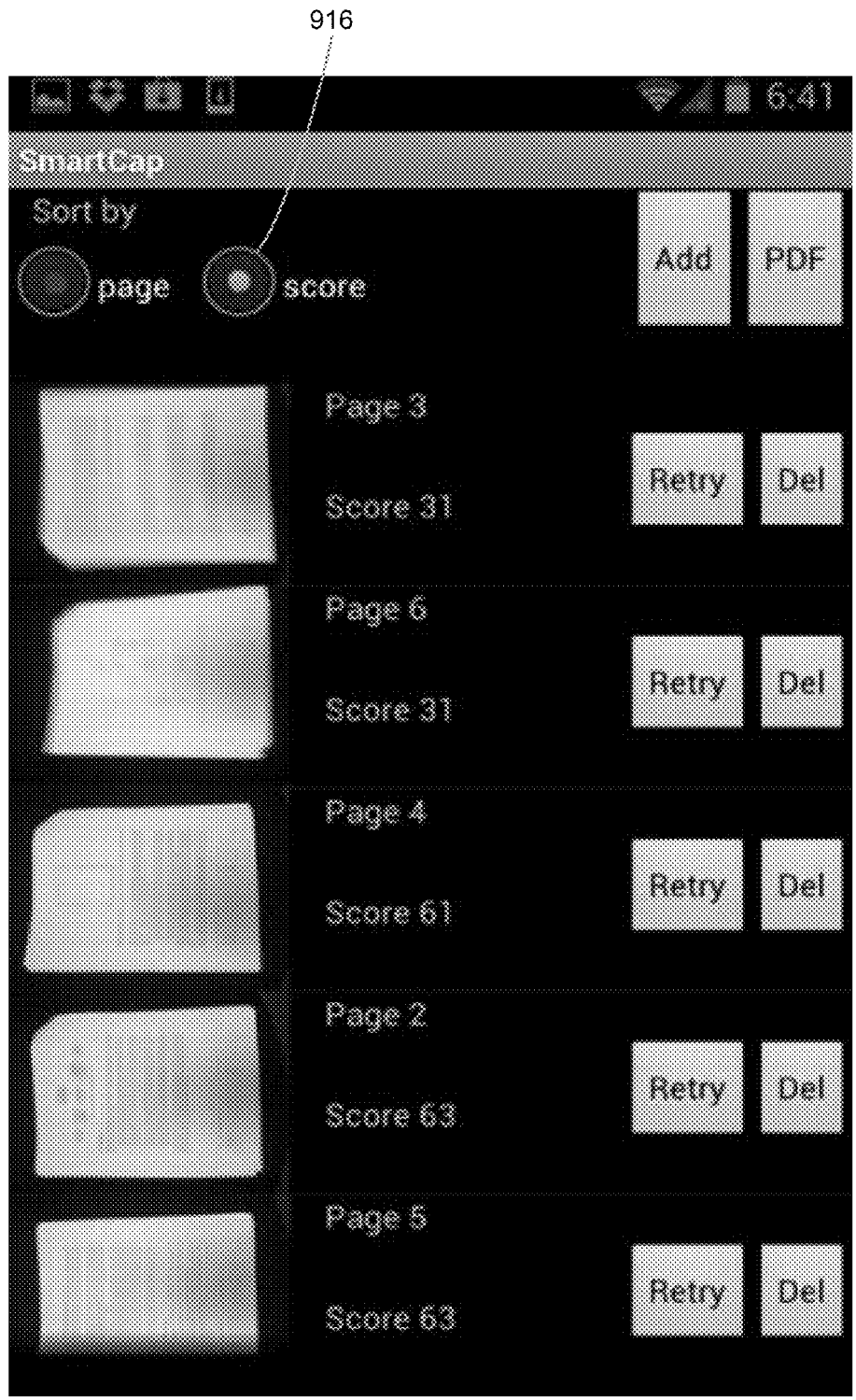
Figure 9C:
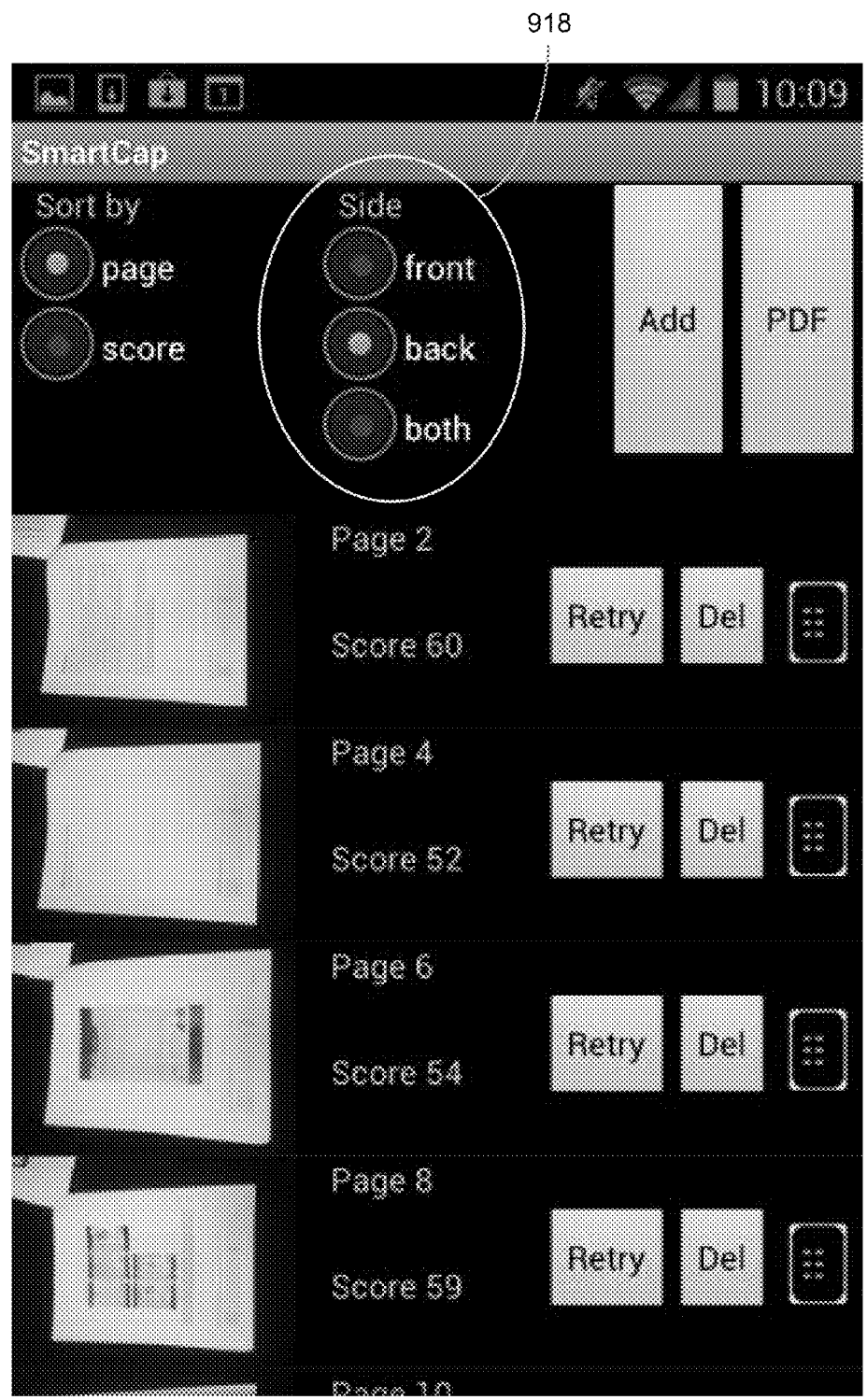

FIGS. 9A-9C illustrate graphical user interfaces used in a review process according to some implementations. In some implementations, the review user interface is presented on the display 104 of the handheld device 102 under the control of the scanning application 224. In FIG. 9A, the page images are sorted by "page" (902), which is the order in which the printed pages were scanned. The user interface includes thumbnail images of the captured images, such as the first page 904. A larger rendering a captured photo is presented when the user selects the thumbnail image (e.g., by touching the portion of the screen 104 displaying the thumbnail image). Adjacent to the thumbnail image is additional information 906 about the captured image. In this illustration, the first image is identified as "Page 1" and the captured image has a quality score of 69. In some implementations, the quality score ranges from 0 (e.g., a blank image) to 100 (e.g., a perfect image). Some implementations compute multiple quality measures and combine them together into a single composite score.

The illustrated user interface includes a "Retry" button 98 for each captured photo, which allows the user to retry capturing a photo of the same page. When pressed, the scanning application 224 discards the current photo for the corresponding page, and initiates the photo capture process as illustrated in FIGS. 7 and 8. Some implementations also include a delete button "Del" that just discards the corresponding saved photo without initiating recapture of the same page.

Some implementations include an "Add" button 912, which allows a user to capture additional images. For example, if the user inadvertently missed a page during the original scan of the printed document, the user may press the "Add" button 912 to initiate capture of the missed page. Some implementations include a button 914 to save the currently captured photos as a document. In FIGS. 9A-9C, this button is labeled "PDF" to indicate that the saved digital document will be in a PDF format. Other implementations have a "save" button 914, which brings up a dialog box. The dialog box allows the user to specify characteristics of digital document, including the name of the file, the location of the file, and the type of file saved (which could be a PDF).

FIG. 9B is similar to FIG. 9A, except that the thumbnail images are sorted based on the quality scores, with the lowest scores appearing first. In the user interface, the user has selection the "score" option button 916.

FIG. 9C is similar to FIGS. 9A and 9B, except that the document was designated as two sided. For a two sided document, a user may wish to view just the front sides, just the back sides, or both. The set of option buttons 918 enables the user to make this selection.

Figure 10:
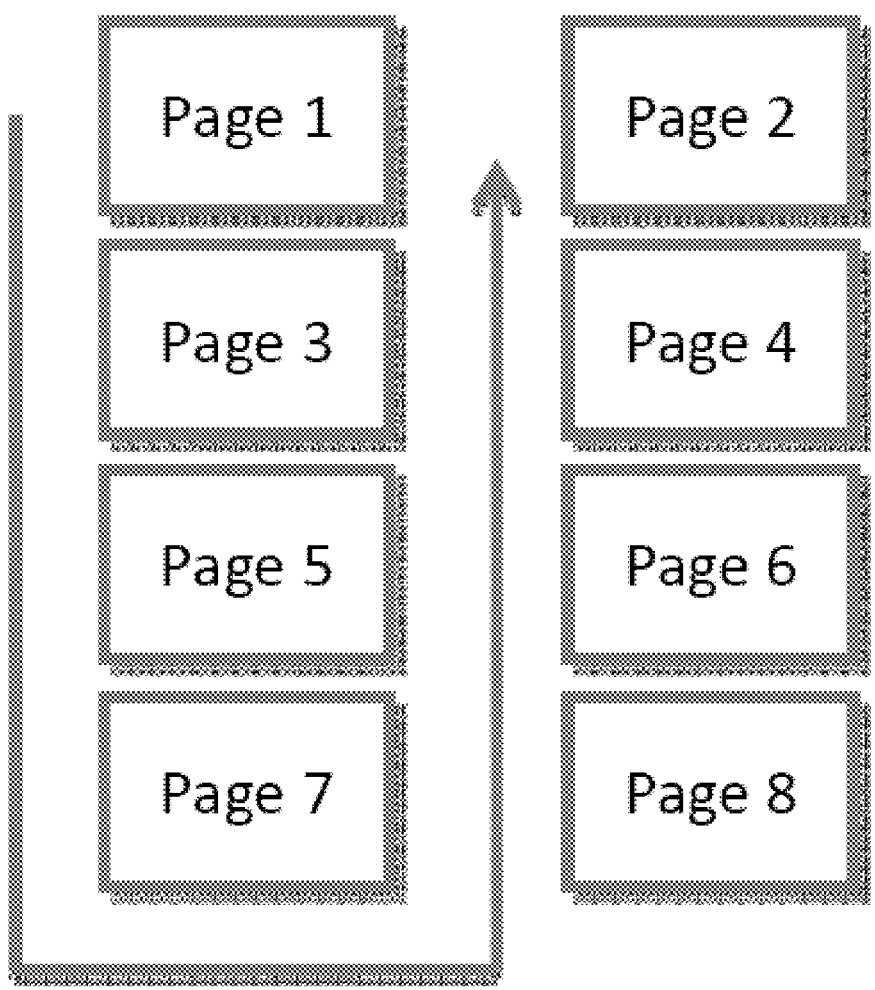
FIG. 10 illustrates an order for scanning the pages of a 2-sided multi-page document in accordance with some implementations.

FIG. 10 illustrates one way that a user can efficiently scan the pages of a two sided document in some implementations. In this illustration, there are eight pages on four printed sheets of paper. The front sides are pages 1, 3, 5, and 7, whereas the backsides are pages 2, 4, 6, and 8. To simplify the scanning process, the user scans the front sides first, in ascending order, then the back sides in descending order. The scan order here is thus 1, 3, 5, 7, 8, 6, 4, 2.

Figure 11:
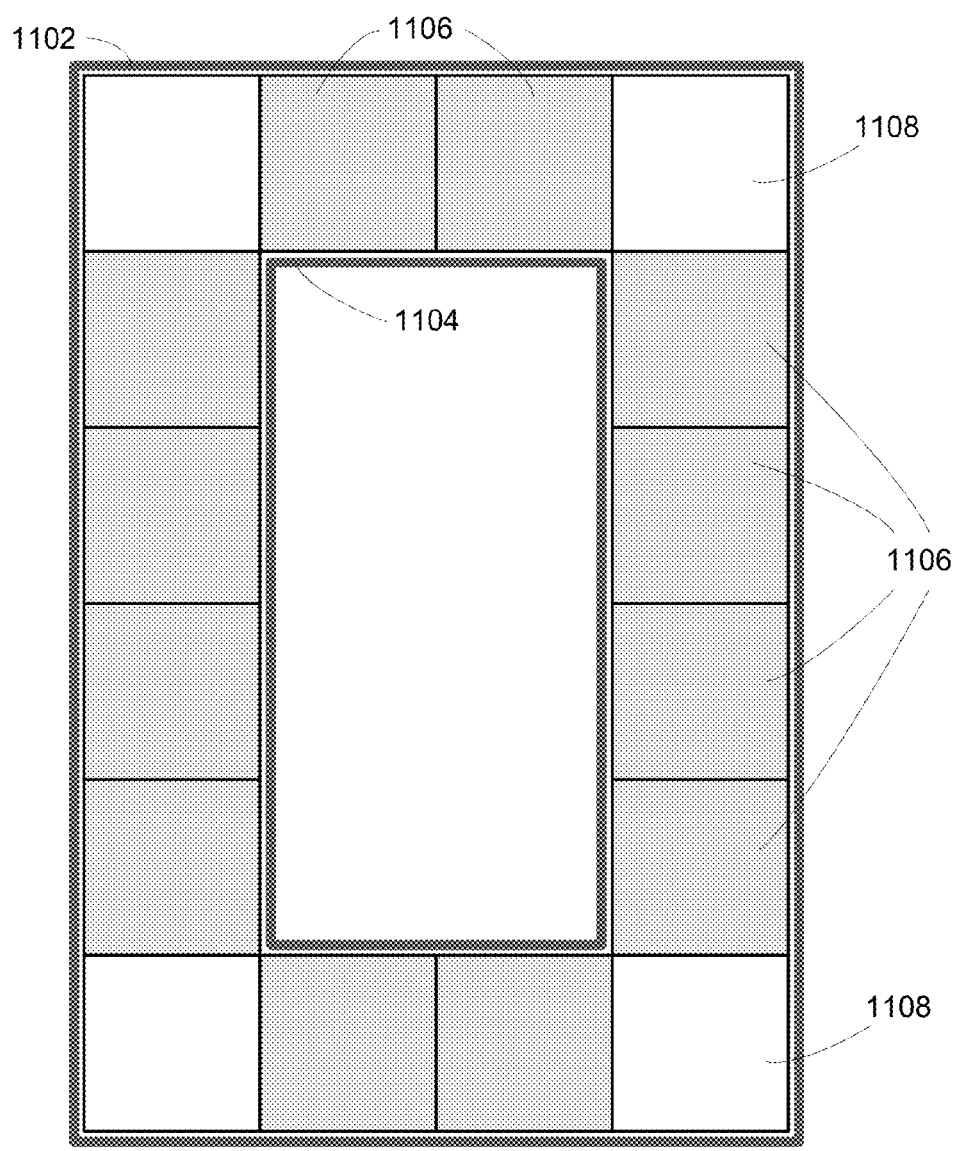
FIGS. 11 and 12 illustrate the identification of edge contours of a printed page in accordance with some implementations.
Figure 12:
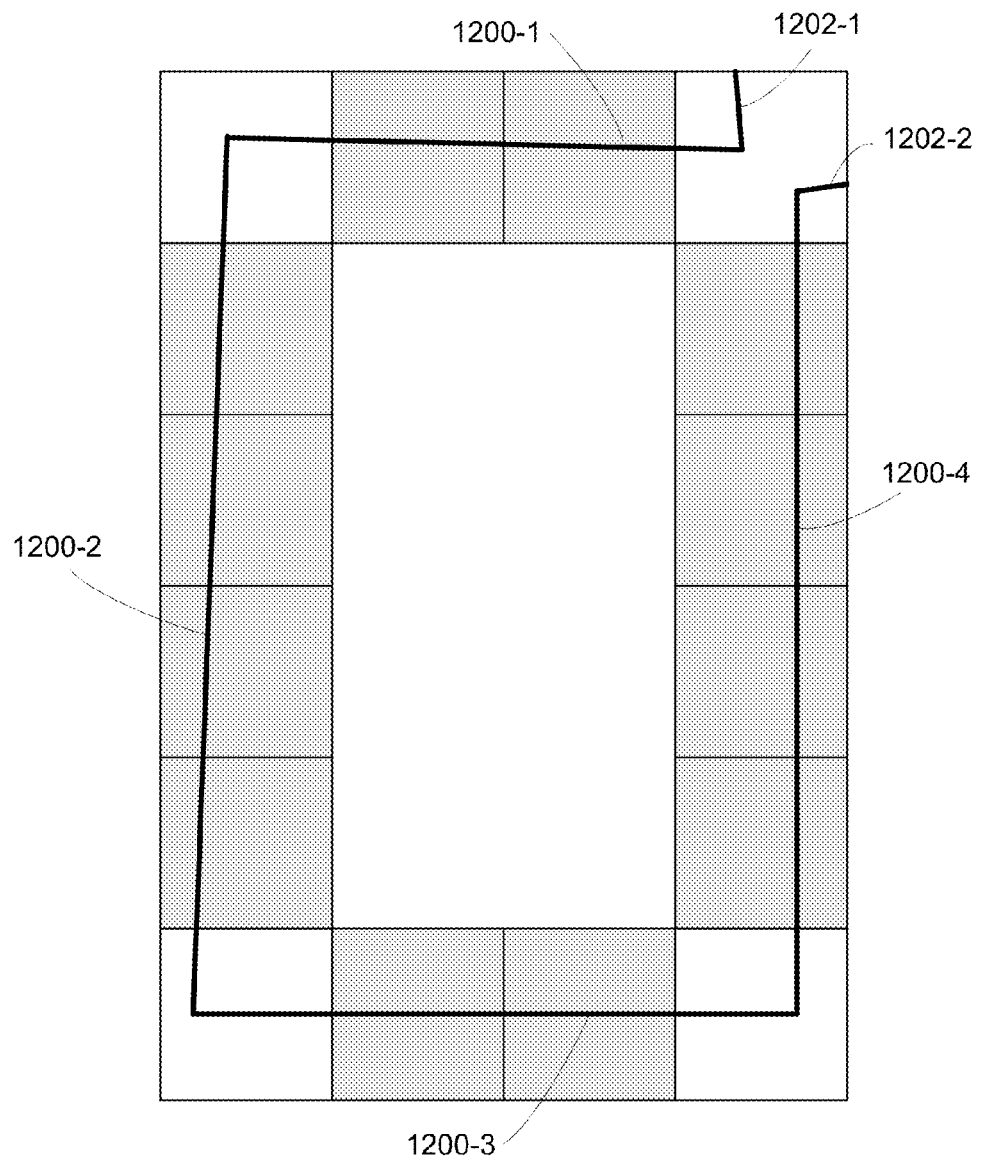

FIGS. 11 and 12 illustrate a process for page framing in accordance with some implementations of the scanning application 224. The process is also illustrated with respect to FIGS. 3A-3C. For framing, the scanning application identifies an inner preview image frame 1104 and an outer preview image frame 1102. These preview image frames are also referred to as framing rectangles. For optimal scanning, the edges of each page should fit between the two framing rectangles.

The area between the preview image frames 1102 and 1104 are broken into tiles, which are either corner tiles 1108 or non-corner tiles 1106. In FIGS. 11 and 12, the corner tiles are white and the non-corner tiles are shaded a light gray. Although the tiles in FIGS. 11 and 12 are squares, square tiles are not required. When the handheld device is properly positioned over the document page 108, the outer contours of the document page fall within the tiles. As shown in FIG. 12, the four document edge lines 1200-1, 1200-2, 1200-3, and 1200-4 fall within the tiles. FIG. 12 also shows a corner tile 1108 with two small edge lines 1202-1 and 1202-2, which probably represent a corner where the printed page 108 is stapled to the rest of the document.

The purpose of framing is to capture an entire page, including edges. Extraneous background can be cropped later. Some implementations use functions in the Open Source Computer Vision library (OpenCV) to identify edges using a Canny edge detector: find contours, compute the bounding box of each contour, and then identify one or more of the largest contours as candidates for the page edge. Large contours can be selected based on contour length, the area covered by a contour, or the area of a bounding box enclosing the contour.

Each contour is then checked to determine whether it fits between the framing rectangles 1102 and 1104. Each tile, except for the corner tiles, is checked for whether it contains a minimum (and optionally a maximum) number of contour points. For example, some implementations identify an edge when each tile contains at least (0.8*height) contour points, where height is measured in pixels. This allows for some missing edge points due to "noise" in the captured image.

The corner tiles 1108 are not included because the number of contour pixels depends on how close a page corner is to a corner of an inner framing rectangle (which could be a very small number). In addition, if a document is stapled, the contour at the stapled corner will include part of the adjacent page. This is illustrated in the upper right corner in FIG. 12.

Figure 13:
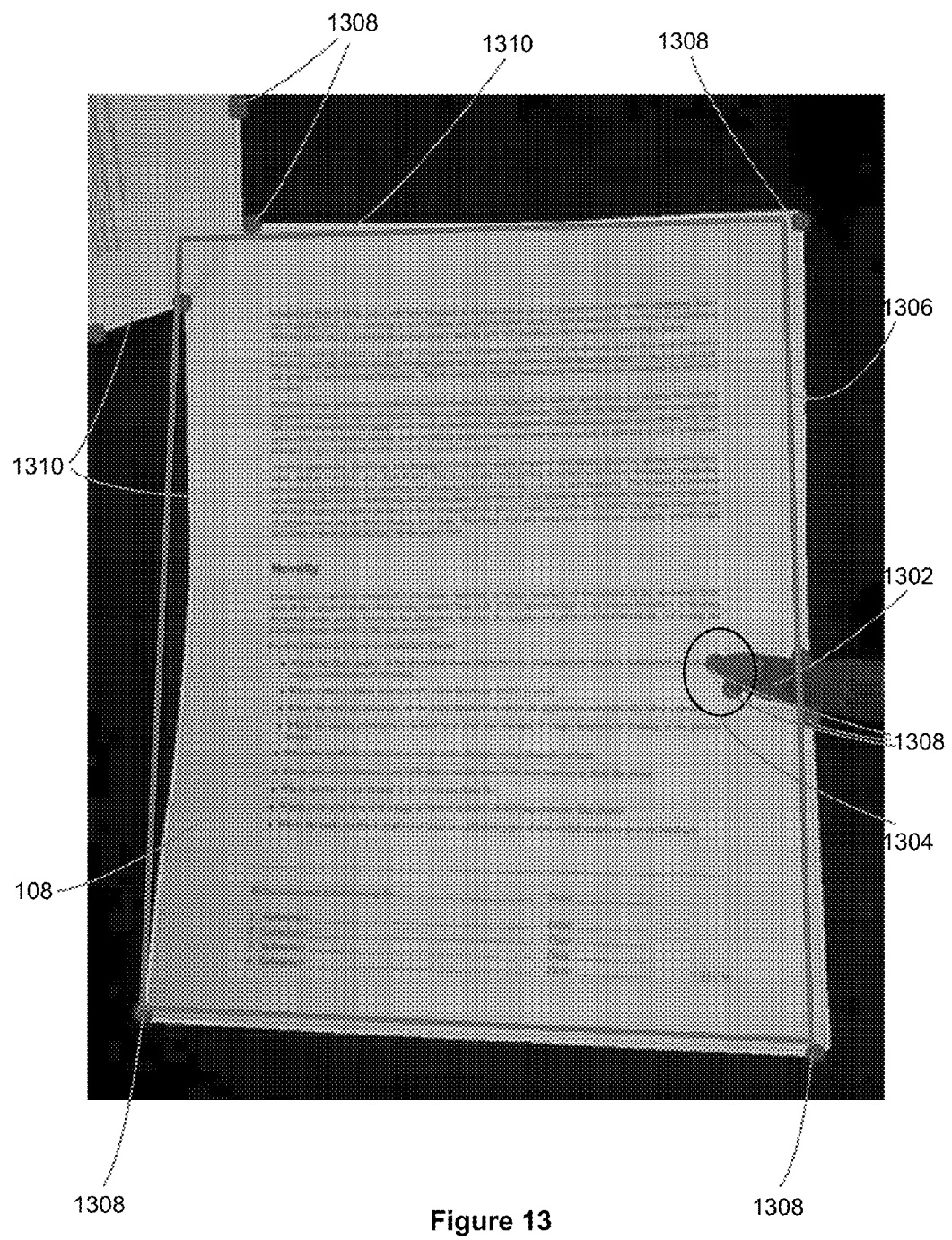
FIGS. 13 and 14 illustrate the identification of edge intrusions in an image in accordance with some implementations.

Some implementations identify "page intrusions," such as a finger or other object covering a portion of an image. This technique is typically applied to preview images, but can also be applied to captured images. FIG. 13 illustrates an image with an object 1302 (a finger) protruding from the right side of the page. Such an intrusion can be identified by examining the page contour 1310 (the outline of the page) for relatively large changes in direction of the contour within each (non-corner) edge tile 1106. (Not all portions of the page contour 1310 are labeled in FIG. 13.) Some implementations compute the absolute value of the second derivative of the contour points and check the values against a threshold on the maximum allowed value. The second derivative should be computed using a difference of several pixels (e.g., 3) to minimize the effects of noise and quantization. When there are no protrusions, the second derivative is relatively small.

Some implementations identify lines formed by the contour points within each non-corner tile 1106 (e.g., using a Hough Transform) and then check whether the distance between contour points and the identified lines has significantly greater variation in one or more of the edge tiles 1106.

In some implementations, the scanning application 224 finds turning points of contour direction and finds 4 document edge lines. Turning points are identified by computing a vector between each pair of adjacent contour points and identifying those points where the direction changes more than a defined amount (e.g., 80 degrees). Some implementations sample the contour points for more efficient computation. The edge lines can be computed using standard techniques, such as the Hough transform. Because the document edge lines 1310 may be curved in the image, some implementations approximate the document edge lines 1310 with a bounding quadrilateral 1306 (illustrated in gray). In some implementations, the bounding quadrilateral 1306 is selected as a rectangle with axes parallel to the sides of the image. When some turning points are inside the bounding quadrilateral 1306, there are some extraneous objects.

This is illustrated in FIG. 13. The page contour 1310 follows the edge of the document, and the turning points of contour direction are depicted as large dots 1308. The bounding quadrilateral 1306 approximates the 4 document edge lines. The turning points 1308 inside the oval 1304 are inside the bounding quadrilateral 1306, indicating that the document has an intrusion. Some implementations also require protrusion by more than a predefined amount in order to be classified as a page intrusion (e.g., more than 5 pixels or more than 20 pixels).

In FIG. 13, the left side of the page bows inward somewhat inside the bounding quadrilateral 1306, but the left side would not be considered a page intrusion. Some implementations recognize the left side of the page as a non-intrusion because there are no turning points. As noted above, other implementations identify the left side of the page as a non-intrusion because the second derivative of the contour 1310 is small.

Figure 14:
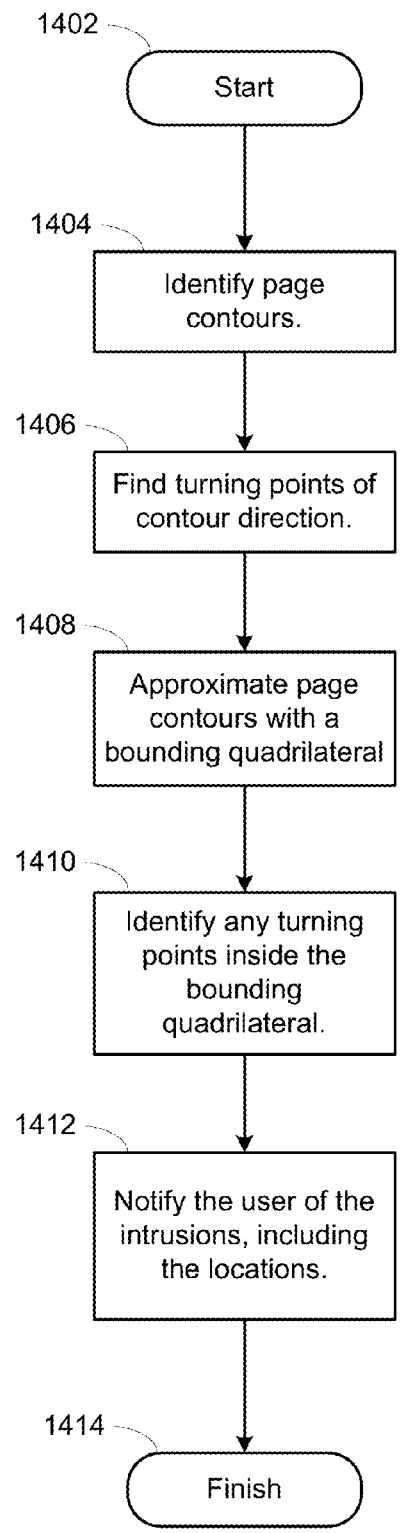

A process for identifying document intrusions is shown in the flow chart of FIG. 14. The process starts (1402) by identifying (1404) the page contour(s) 1310. As indicated above with respect to FIG. 13, the process then finds (1406) turning points of contour direction. Using the identified contour(s), the process approximates (1408) the page contours with a bounding quadrilateral 1306. As illustrated in the top left corner of FIG. 13, the small document edge portions in a corner are not included in the four document edge lines. Next, the process identifies (1410) any turning points inside the region formed by the page contours 1310. Typically the page contours 1310 are curved or crooked, as illustrated in FIG. 13, so a quadrilateral 1306 (e.g., a rectangle) approximating the page contours 1310 is used instead. If there are any turning points inside the bounding quadrilateral 1306 (or the page contours 1310), the process notifies (1412) the user of the intrusions. Some implementations also notify (1412) the user where the intrusions appear. After the notification(s), the process is (1414) finished.

Figure 15A:
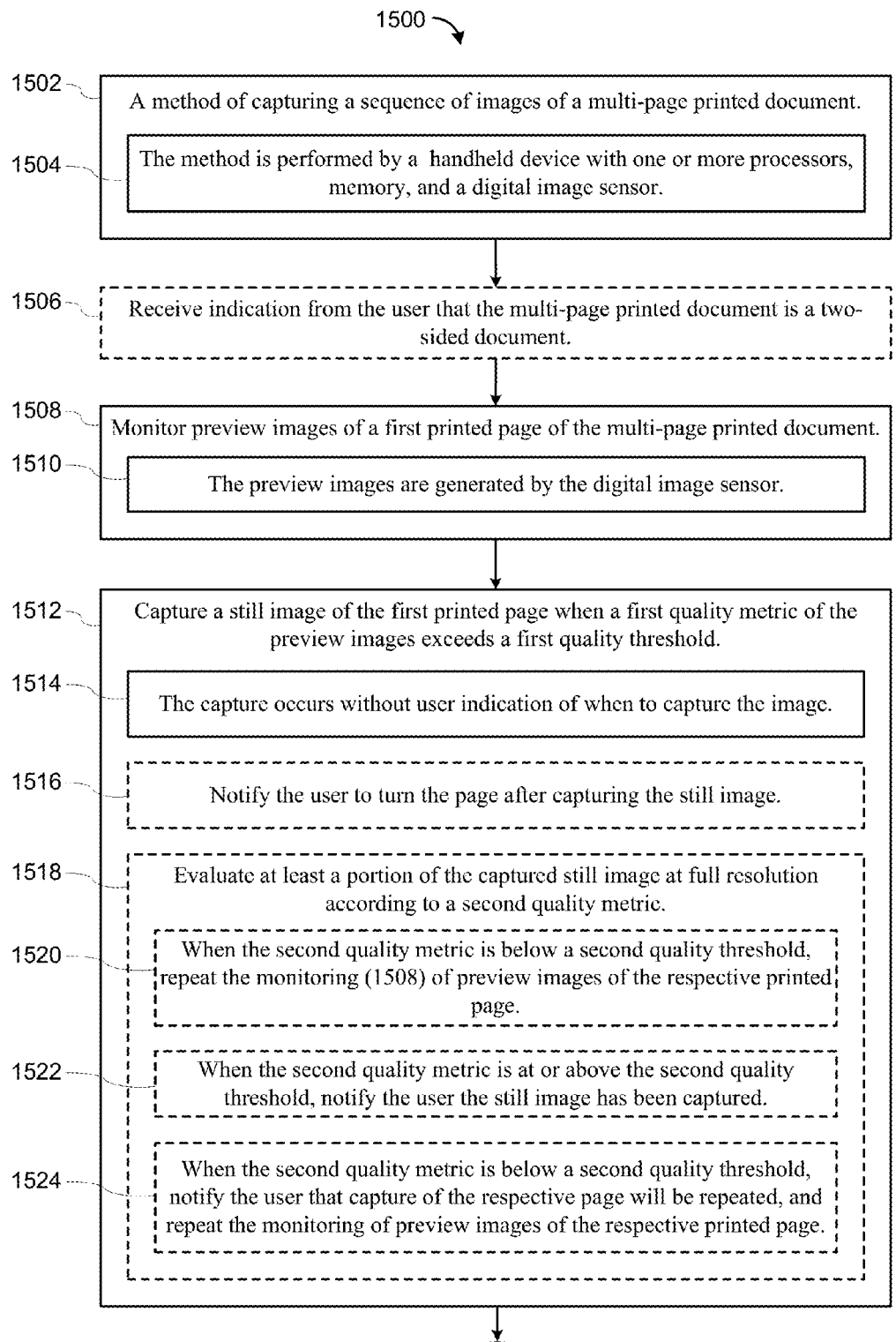
FIGS. 15A-15C illustrate a process of automatically capturing a sequence of images for a multi-page printed document in accordance with some implementations.
Figure 15B:
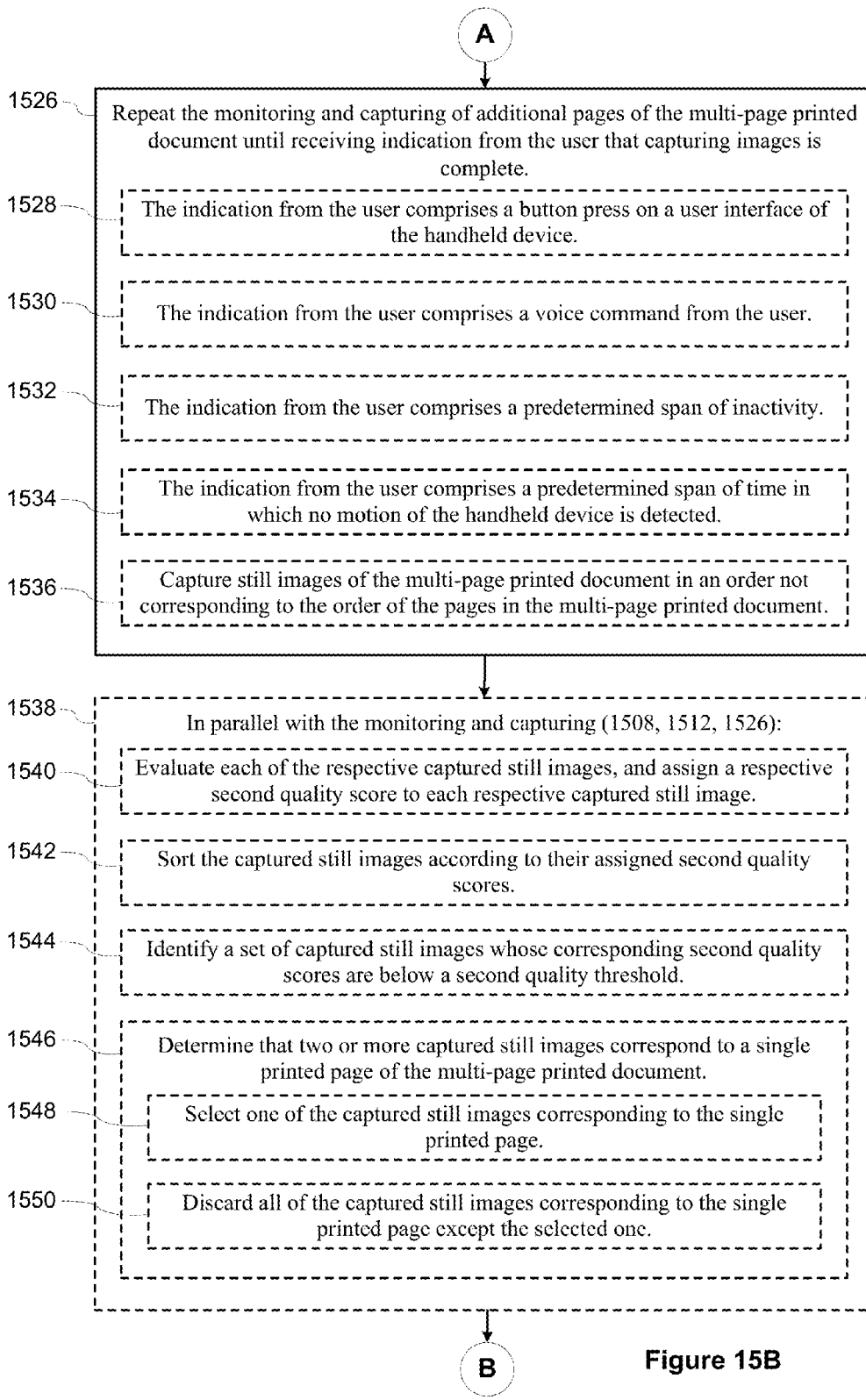
Figure 15C:
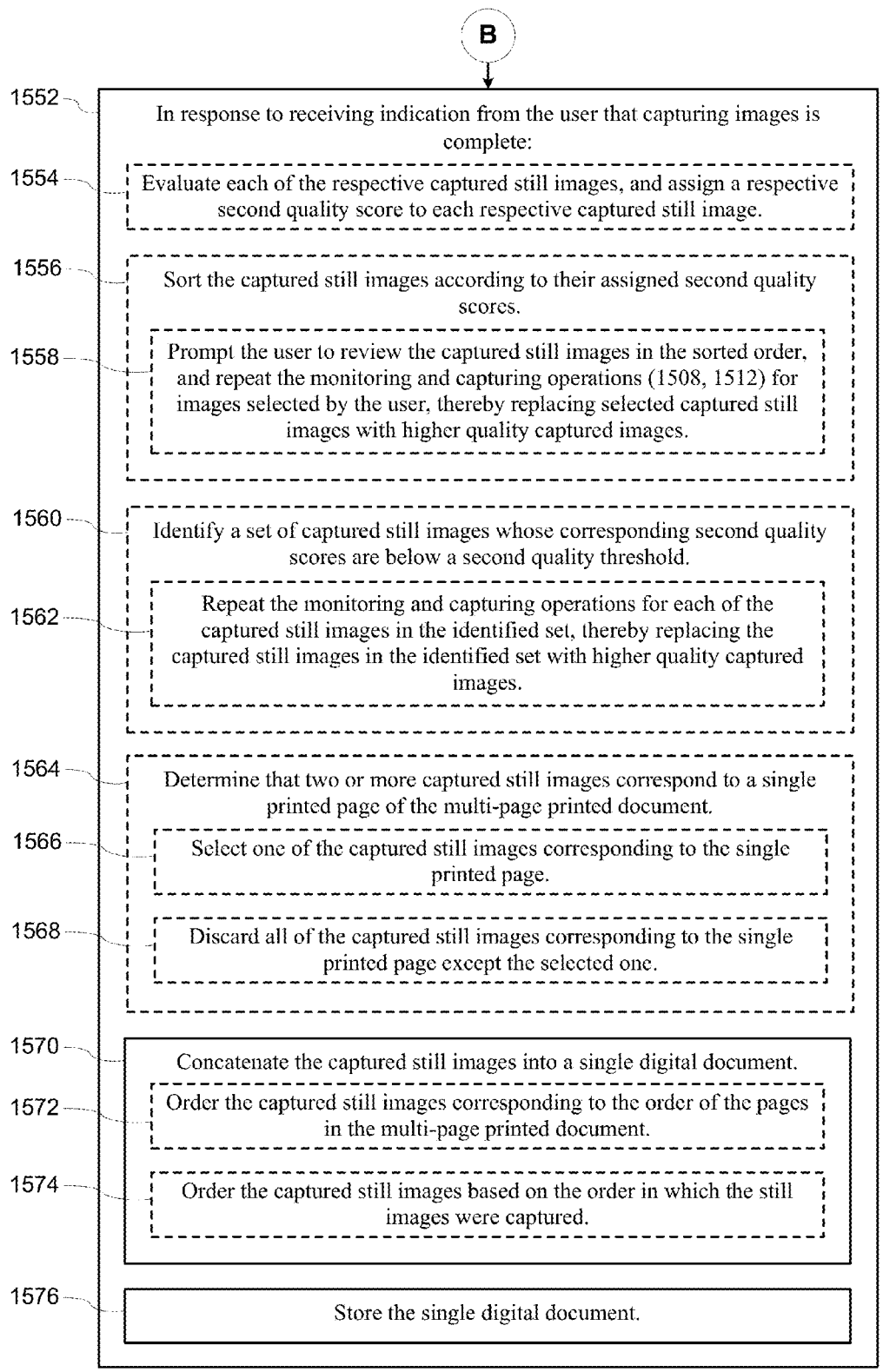

FIGS. 15A-15C are a flow diagram of a process 1500 for capturing (1502) a sequence of images of pages in a multi-page printed document in accordance with some implementations. The process is performed (1504) by a hand-held device 102 with one or more processors 202, memory 214, and a digital image sensor 252. In some instances, the device 102 receives (1506) an indication from the user that the multi-page document to be scanned is a two-sided document. Some implementations include a button or other user interface control for the user to indicate that the document to be scanned is two-sided. In some implementations, a user indicates a two-sided document using a voice command. In some implementations, there is a user-configurable default for whether scanned documents are single-sided or double-sided. The user configurable default is saved as part of the user preferences 238.

The scanning application 224 on the device 102 monitors (1508) preview images 234 of a first printed page 108 of the multi-page printed document. The preview images 234 are generated (1510) by the digital image sensor. Typically the preview images 234 are not full-resolution. The scanning application 224 computes a first quality metric, which includes a framing quality component and/or a sharpness quality component. The first quality is compared to a first quality threshold (a sharpness threshold 228 and/or framing quality threshold), and when the first quality metric of the first page exceeds the first quality threshold, the scanning application captures (1512) a still image of the first printed page. The capture occurs (1514) without user indication of when to capture the image (i.e., automatically when the conditions for capture are met). In some implementations, the scanning application 224 notifies (1516) the user of the capture so that the user knows to turn to the next page in the document.

In some implementations, the captured image is evaluated immediately after capture to verify that the captured image 236 is of sufficient quality before going on to the next page of the document. In these embodiments, at least a portion of the captured still image 236 is evaluated (1518) at full resolution according to a second quality metric. In some implementations, when the second quality metric is below a second quality threshold, the scanning application 224 repeats (1520) the monitoring of preview images 234 of the same printed page. In some of these implementations, the scanning application 224 discards the captured images 236 whose second quality metrics fall below the second quality threshold. The process of monitoring preview images 234, capturing a still image 236, and evaluating the captured still image 236 may occur multiple times for one page if the second quality metric of images of the page continue to be below the second quality threshold.

In some implementations, the scanning application notifies (1522) the user that a still image has been captured when the second quality metric for the captured image is at or above the second quality threshold. In these implementations, the user is notified of the capture only after the evaluation process so that the user does not prematurely turn to the next page of the document. Even though the handheld device could be capturing and evaluating several (or many) images, the user should keep the device steady and in place without turning the page until a quality image has been captured.

In alternative implementations that notify the user when an image is captured, the scanning application 224 notifies (1524) the user again when the quality of the captured image is below the second quality threshold, thus alerting the user that the capture process must be repeated. In some implementations, the user preferences 238 include the first and/or second quality thresholds, enabling a user to control the quality and speed of the photo capture. Some implementations also include a user preference 238 to specify whether image capture notifications occur before or after the image evaluation process. As described in more detail below, some implementations have a batch image evaluation process that occurs after all of the images have been captured.

Evaluating captured images immediately after capture has some weaknesses. For example, some printed pages may be inherently difficult to capture at very high quality (e.g., if the "original" printed document is blurry), so it may be difficult or impossible for the scanning application to capture a sufficiently good image. In another example, a captured image 236 may exceed the second quality threshold, and thus prompt the user to move on to the next page. However, this overlooks the possibility that an even better quality image could be captured. Some implementations address these and other issues by supporting a burst mode of image capture. In a burst mode, the scanning application 224 captures a plurality of images of the same printed page in a burst, providing feedback to the user (e.g., a "click" sound after each capture or a sound indicating that a certain number of images (e.g., 5 or 10) have been captured. When burst mode is used, the duplicate images are evaluated as a group, and the best one in each group is selected. Note that a user could also inadvertently capture more than one image of the same page. Both intentional and accidental capture of multiple images is addressed below.

The scanning application 224 repeats (1526) the monitoring and capturing of additional pages of the multi-page printed document until receiving indication from the user that capturing images is complete. In some instances, the indication from the user is active, such as pressing (1528) a button (e.g., "Done" or "Finished") in a user interface on the device 102, or receiving (1530) a voice command from the user. In other instances, the indication from the user is passive, such as a predetermined span of inactivity 1532 or a predetermined span of time 1534 in which no motion of the handheld device 102 is detected. The passive indications include setting the device 102 down for a period of time (both inactivity and no motion) or placing the device in a pocket. Even though a device in a pocket might be moving, the preview images 234 inside a pocket should not meet the first quality threshold, and thus not result in captured images (i.e., inactivity). Typical implementations support both active and passive methods of indicating when capturing images is complete.

Some implementations support capturing (1536) still images of the multi-page document in an order not corresponding to the order of the pages in the multi-page printed document. For two-sided documents, this was illustrated previously with respect to FIG. 10. In addition, some implementations identify page numbers on the printed pages (e.g., using OCR for certain regions of a printed page, such as the top margin or bottom margin). In these implementations, the scanning application can later sort the captured images based on page number order.

There are some operations that can be performed after all of the images are captured and the user has indicated that the capture process is complete or in parallel with the image capture process. In some implementations, both modes are supported, and parallel processing occurs when there are sufficient processing resources (e.g., CPU capacity, memory availability). In some implementations, one or more of the following operations processes (1538) in parallel with the monitoring and capturing operations 1508, 1512, and 1526 identified above:

- Evaluate (1540) each of the respective captured still images 236, and assign a second quality score to each respective captured still image;
- Sort (1542) the captured still images 236 according to their assigned second quality scores;
- Identify (1544) a set of captured still images 236 whose corresponding second quality scores are below a second quality threshold; and/or
- Determine (1546) that two or more captured still images 236 correspond to a single printed page of the multi-page printed document. When this determination occurs, select (1548) one of the captured still images 236 corresponding to the single printed page (typically the one with the highest quality score), and discard (1550) all of the other captured still images 236 corresponding to the single printed page (i.e., keep the selected one, and discard the rest). In some implementations, when the images to discard are in non-volatile memory (e.g., a hard disk), they are physically deleted. In other implementations, when the images to discard are in volatile memory (e.g., RAM), the physical space allocated for "discarded" images is not necessarily erased or overwritten immediately.

When the scanning application 224 receives the indication from the user that capturing images is complete, the scanning application performs (1552) some additional operations. The review process was described previously with respect to FIGS. 7 and 8. In some implementations, the scanning application 224 evaluates (1554) each of the respective captured still images 236, and assigns a respective a respective second quality score to each respective captured still image 236. In some implementations, the second quality score is a single number that identifies the sharpness of the captured image, the framing quality of the captured image, or a composite score that takes into account both sharpness and framing. In other implementations, the second quality score comprises a set of sub-scores, such as sharpness score and a framing score. When comparing a multi-value score to a threshold (which is also multi-valued), the score exceeds the threshold only when each of the sub-scores exceeds the corresponding sub-value of the multi-valued threshold. For example, the sharpness sub-score must exceed the threshold sharpness value and the framing sub-score must exceed the threshold framing value.

In some implementations, the scanning application sorts (1556) the captured still images 236 according to their assigned second quality scores. In some implementations, the scanning application 224 prompts (1558) the user to review the captured still images in the sorted order, as illustrated in FIG. 9B. The scanning application repeats (1558) the monitoring and capturing operations (1508, 1512) for images selected by the user, thereby replacing selected captured still images with higher quality captured images.

In other implementations, the scanning application automatically identifies (1560) a set of captured still images 236 whose corresponding second quality scores are below a second quality threshold. The scanning application then repeats (1562) the monitoring and capturing operations for each of the captured still images in the identified set, thereby replacing the captured still images in the identified set with higher quality captured images.

In some implementations, the second quality threshold is a user configurable preference 238, so the user can decide what quality level is satisfactory. Some implementations support both manual review of captured images 236 (typically sorted, as illustrated in FIG. 9B), as well as automatic identification of captured images whose second quality scores are below the second quality threshold. In these implementations, the application includes a user configurable preference for which review option to use. Of course some implementations support both batch review (at the end) as well as dynamic review (as each image or burst of images is captured).

In some implementations, the scanning application determines (1564) that two or more captured still images 236 correspond to a single printed page of the multi-page printed document. When this determination occurs, the scanning application selects (1566) one of the captured still images 236 corresponding to the single printed page (typically the one with the highest quality score), and discards (1568) all of the other captured still images 236 corresponding to the single printed page (i.e., keep the selected one, and discard the rest). In some implementations, when the images to discard are in non-volatile memory (e.g., a hard disk), they are physically deleted. In other implementations, when the images to discard are in volatile memory (e.g., RAM), the physical space allocated for "discarded" images is not necessarily erased or overwritten immediately.

Regardless of which of the review processes occur in response to receiving indication from the user that capturing images is complete, the scanning application finally concatenates (1570) the capture still images into a single digital document 240. In some implementations, the captured still images are ordered (1572) corresponding to the order of the pages in the multi-page printed document, thus creating a digital document 240 whose pages correspond to the printed document. In some instances, the reordered is done for two-sided documents as illustrated and described with respect to FIG. 10. In addition, some implementations identify page numbers on the printed document, and order the captured images based on those page numbers, regardless of the order in which they were captured. Some implementations identify page numbers using optical character recognition (OCR) in designated portions of the image, such as the top margin or bottom margin. Other implementations order (1574) the captured still images based on the order in which the still images were captured. Some implementations support two or more sort orders for saving captured images in a digital document 240, and include one or more user preferences to select the sort order option. After sorting (if any) and concatenating the images, the scanning application stores (1576) the single digital document 240.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of capturing a sequence of images of a multi-page printed document, performed by a handheld device with one or more processors, memory, and a digital image sensor, the method comprising:

monitoring a time sequence of preview images of a first printed page of the multi-page printed document, the preview images generated by the digital image sensor;

without user indication of when to capture an image, capturing a still image of the first printed page when a first quality metric of the preview images exceeds a first quality threshold;

repeating the monitoring and capturing of additional pages of the multi-page printed document until receiving indication from the user that capturing images is complete; and in response to receiving indication from the user that capturing images is complete:
concatenating the captured still images into a single digital document; and
storing the single digital document.

2. The method of claim 1, wherein capturing an image of a respective printed page further comprises notifying the user to turn the page after capturing the still image.

3. The method of claim 1, wherein capturing an image of a respective printed page further comprises after capturing the still image:
evaluating at least a portion of the captured still image at full resolution according to a second quality metric;
when the second quality metric is below a second quality threshold, notifying the user that capture of the respective page will be repeated, and repeating the monitoring of preview images of the respective printed page.

4. The method of claim 1, wherein capturing an image of a respective printed page further comprises after capturing the still image:
evaluating at least a portion of the captured still image at full resolution according to a second quality metric;
when the second quality metric is below a second quality threshold, repeating the monitoring of preview images of the respective printed page; and
when the second quality metric is at or above the second quality threshold, notifying the user the still image has been captured.

5. The method of claim 1, further comprising:
evaluating each of the respective captured still images, and assigning a respective second quality score to each respective captured still image;
sorting the captured still images according to their assigned second quality scores; and
prompting the user to review the captured still images in the sorted order, and repeating the monitoring and capturing operations for images selected by the user, thereby replacing selected captured still images with higher quality captured images.

6. The method of claim 5, wherein the evaluating, sorting, and prompting are in response to receiving the indication from the user that capturing images is complete.

7. The method of claim 1, further comprising:
evaluating each of the respective captured still images, and assigning a respective second quality score to each respective captured still image;
identifying a set of captured still images whose corresponding second quality scores are below a second quality threshold; and
repeating the monitoring and capturing operations for each of the captured still images in the identified set, thereby replacing the captured still images in the identified set with higher quality captured images.

8. The method of claim 7, wherein the evaluating, identifying, and repeating the monitoring and capturing operations for each of the captured still images in the identified set are in response to receiving the indication from the user that capturing images is complete.

9. The method of claim 1, wherein the indication from the user comprises a button press on a user interface of the handheld device.

10. The method of claim 1, wherein the indication from the user comprises a voice command from the user.

11. The method of claim 1, further comprising:
determining that two or more captured still images correspond to a single printed page of the multi-page printed document;
selecting one of the captured still images corresponding to the single printed page; and
discarding all of the captured still images corresponding to the single printed page except the selected one.

12. The method of claim 11, wherein the determining, selecting, and discarding are in response to receiving the indication from the user that capturing images is complete.

13. The method of claim 1, further comprising:
receiving indication from the user that the multi-page printed document is a two-sided document; and
capturing still images of the multi-page printed document in an order not corresponding to the order of the pages in the multi-page printed document;
wherein concatenating the captured still images into a single digital document further comprises ordering the captured still images corresponding to the order of the pages in the multi-page printed document.

14. The method of claim 1, wherein concatenating the captured still images into a single digital document further comprises ordering the captured still images based on the order in which the still images were captured.

15. The method of claim 1, wherein monitoring preview images further comprises:
identifying four document edge lines in a first preview image;
determining whether there are any turning points for the first preview image inside a rectangle formed by the four document edge lines; and
when there are one or more turning points inside the rectangle, notifying the user of an image protrusion.

16. A system for capturing a sequence of images of a multi-page printed document, comprising:
one or more processors;
memory; and
one or more programs stored in the memory, the one or more programs comprising instructions for:
monitoring a time sequence of preview images of a first printed page of the multi-page printed document, the preview images generated by the digital image sensor;
capturing a still image of the first printed page when a first quality metric of the preview images exceeds a first quality threshold, executed without user indication of when to capture the still image;
repeating the monitoring and capturing of additional pages of the multi-page printed document until receiving indication from the user that capturing images is complete; and
responding to receiving indication from the user that capturing images is complete, including instructions for:
concatenating the captured still images into a single digital document; and
storing the single digital document.

17. A computer readable storage medium storing one or more programs configured for execution by a computer, the one or more programs comprising instructions for:
- monitoring a time sequence of preview images of a first printed page of the multi-page printed document, the preview images generated by the digital image sensor;
- capturing a still image of the first printed page when a first quality metric of the preview images exceeds a first quality threshold, executed without user indication of when to capture the still image;
- repeating the monitoring and capturing of additional pages of the multi-page printed document until receiving indication from the user that capturing images is complete; and
- responding to receiving indication from the user that capturing images is complete, including instructions for:
  - concatenating the captured still images into a single digital document; and
  - storing the single digital document.

* * * * *